United States Patent
Song

(10) Patent No.: US 7,751,115 B2
(45) Date of Patent: Jul. 6, 2010

(54) ELECTRONIC PAPER DISPLAY DEVICE, MANUFACTURING METHOD AND DRIVING METHOD THEREOF

(75) Inventor: Moon Bong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 921 days.

(21) Appl. No.: 11/509,678

(22) Filed: Aug. 25, 2006

(65) Prior Publication Data

US 2007/0046623 A1   Mar. 1, 2007

(30) Foreign Application Priority Data

| Aug. 26, 2005 | (KR) | 10-2005-0078777 |
| Oct. 5, 2005 | (KR) | 10-2005-0093434 |
| Oct. 11, 2005 | (KR) | 10-2005-0095507 |
| Oct. 15, 2005 | (KR) | 10-2005-0097249 |

(51) Int. Cl.
  *G02B 26/00* (2006.01)
  *G09G 3/34* (2006.01)

(52) U.S. Cl. .................. 359/296; 345/107

(58) Field of Classification Search .......... 345/345, 345/107; 359/296
See application file for complete search history.

(56) References Cited

U.S. PATENT DOCUMENTS

2007/0046566 A1*  3/2007  Song ................ 345/30

FOREIGN PATENT DOCUMENTS

| JP | 12-194020 A | 7/2000 |
| JP | 14-062847 A | 2/2002 |
| JP | 15-186065 A | 7/2003 |
| JP | 16-199083 A | 7/2004 |

* cited by examiner

*Primary Examiner*—David N Spector
(74) *Attorney, Agent, or Firm*—Birch, Stewart, Kolasch, & Birch, LLP

(57) ABSTRACT

An electronic paper display device, a manufacturing method and a driving method thereof are disclosed. Micro protrusion members are formed at electrodes or at insulating layers. Consequently, the electrophoretic particles are prevented from being securely attached to an upper or the lower structure, and therefore, the quality of pictures is improved, and the contrast ratio of the pictures is increased. The relative sizes and the injection amounts of two kinds of electrophoretic particles are changed such that the relative sizes and the injection amounts of the electrophoretic particles are different from each other. Consequently, the driving voltage is lowered by excessively electrifying the electrophoretic particles of one kind. Protrusions are formed at the corresponding electrode such that a relatively large electric field is distributed around the electrode at which electrophoretic particles are located in the initial stage of voltage application. Consequently, the electrophoretic particles are easily separated from the electrode and moved even at low driving voltage. As such, the voltage level of the driving voltage pulse is lowered. Consequently, it is possible to further increase the response speed of the driving devices and to lower the internal voltage of the devices, thereby reducing the costs related to the driving devices.

25 Claims, 22 Drawing Sheets

ELECTRONIC PAPER DISPLAY DEVICE, MANUFACTURING METHOD AND DRIVING METHOD THEREOF

This application claims the benefit of Korean Patent Application Nos. 10-2005-0078777, filed on Aug. 26, 2005, 10-2005-0097249, filed on Oct. 15, 2005, 10-2005-0095507, filed on Oct. 11, 2005, 10-2005-0093434, filed on Oct. 5, 2005 which is hereby incorporated by reference as if fully set forth herein.

BACKGROUND OF THE INVENTION

1. Field of the Invention

The present invention relates to an electronic paper display device, a manufacturing method and a driving method thereof.

2. Discussion of the Related Art

An electronic paper display device is a core device to realize a flexible display. The electronic paper display device is based on electrophoresis in which an electromagnetic field is applied to a conductive material such that the conductive material has mobility. Micro particles having conductivity are distributed between thin-type flexible substrates, and positions of the micro particles (or toner particles) are changed due to the change of the polarities of an electromagnetic field, whereby data is displayed.

The technical approach to realize the electronic paper may be accomplished using liquid crystals, organic electro luminescence (EL), reflective film reflection-type display, electrophoresis, twist balls, or mechanical reflection-type display. Among them, an electronic paper display device using electrophoresis is the most notable technology at the present time. The electrophoresis is a phenomenon in which, when particles are suspended in a medium (a dispersion medium), the particles are electrically charged, and, when an electric field is applied to the charged particles, the particles move to an electrode having opposite charge through the dispersion medium.

FIG. 1 is a sectional view illustrating an electronic paper display device using micro capsules manufactured by E-Ink Corporation. As shown in FIG. 1, transparent micro capsules 100 having a diameter of 200 to 300 μm, each of which contains specific-color ink particles 103a having a specific electric charge, different-color ink particles (or colored rheological material) 103b having an electric charge opposite to that of the ink particles 103a, and a transparent rheological material 104, are manufactured. The manufactured micro capsules 100 are disposed between upper and lower transparent electrodes 105 and 106 while the micro capsules 100 are mixed with a binder 107, and then voltage is applied to the micro capsules to display characters or images.

However, this structure is a wet-type structure in which the response speed is decreased to approximately 100 ms due to the viscous resistance of the liquid, and therefore, it is difficult to display moving pictures. Furthermore, it is necessary to equally maintain specific gravity between the electrified two-color particles and the rheological material, to prevent cohesion between the electrified two particles, and to carry out additional physical and chemical processes for electric charge attachment, which is required to accomplish electrophoretic mobility. Specifically, it is necessary to additionally carry out a step of introducing a functional group to facilitate the introduction of white color and attachment of an electric charge controlling agent after chemical and physical polymer coating is performed or polymer balls are created. As a result, the process is complicated.

FIG. 2 is a sectional view illustrating a dry-type electronic paper display device. As shown in FIG. 2, the dry-type electronic paper display device includes one or more pixels isolated from each other by barrier ribs 113. Two kinds of electrophoretic particles 116 having different colors and electrification characteristics are encapsulated between transparent substrates 111 and 112 having electrodes 114 and 115 formed at the inner surfaces thereof. Voltage is applied to the upper and lower electrodes 114 and 115 such that the electrophoretic particles collide with each other, and therefore, the particles are charged due to the collision, thereby forming electrophoretic particles. After that, an electric field is applied to the electrified electrophoretic particle groups such that the electrified electrophoretic particle groups can move from the upper and lower electrodes 114 and 115 having different electric potential, whereby pictures are displayed. The dry-type electronic paper display device may further include insulating layers 117 to effectively prevent the electrified electrophoretic particles from being discharged.

FIG. 3 is a graph illustrating the change of reflection rate based on driving voltage in an electronic paper display device. Specifically, FIG. 3 illustrates the change of light reflection rate at the respective cells of the above-described dry-type electronic paper display device as voltage is applied to the first and second electrodes 114 and 115 of the electronic paper display device.

Black and white dry-type particle groups having different electrification characteristics exist in each cell of the dry-type electronic paper display device. When voltage is applied to the first and second electrodes 114 and 115, the respective particles collide with each other with the result that the black particle group is charged with positive charges, whereas the white particle group is charged with negative charges, which will be described below in more detail.

Referring to the drawings, as the magnitude of voltage applied to the first and second electrodes 114 and 115 is increased from V1 to V2, the white particle group charged with the negative charges gradually moves to the upper electrode 114 having the positive potential. As a result, the light reflection rate of the cell is increased.

When voltage of more than V2 is applied to the first and second electrodes 114 and 115, the white particle group existing in the cell moves to the upper electrode 114. As a result, the light reflection rate is maximized.

When voltage of less than V1 is applied to the first and second electrodes 114 and 115, on the other hand, the black particle group remains at the upper electrode 114, and the white particle group cannot move to the upper electrode 114. As a result, the light reflection rate is minimized. In other words, the cell displays black.

The V1 voltage means a threshold voltage at which the light reflection rate of the cell begins to be changed, i.e., at which the white particle group located at the lower electrode 115 begins to move to the upper electrode 114. The V2 voltage means a voltage at which the white particle group existing in the cell can move to the upper electrode 114 while the black particle group can move to the lower electrode 115.

Unlike the wet-type electronic paper display device, the dry-type electronic paper display device has a threshold voltage of a predetermined voltage level necessary to move the black and white particle groups in the cell.

For this reason, only when a pulse having a driving voltage of V2, which is greater than the threshold voltage, is selectively applied to the upper electrode (data electrode) 114 and the lower electrode (scan electrode) 115, desired data can be displayed.

Consequently, a driving voltage pulse having a large voltage level corresponding to V2 must be applied in the electronic paper display device, and therefore, the internal voltage of driving devices must be large. Furthermore, time necessary to generate the driving voltage pulse having the large voltage level is increased with the result that the response speed is lowered.

SUMMARY OF THE INVENTION

Accordingly, the present invention is directed to an electronic paper display device, a manufacturing method and a driving method thereof that substantially obviate one or more problems due to limitations and disadvantages of the related art.

An object of the present invention is to provide an electronic paper display device, a manufacturing method and a driving method thereof wherein the internal voltage of driving devices to drive the electronic paper display device is reduced, and the driving devices are operated at more rapid response speed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electronic paper display device includes a first substrate and a second substrate, which are disposed opposite to each other while the first substrate and the second substrate are spaced apart from each other, a plurality of first electrodes and a plurality of second electrodes formed at the bottom of the first substrate and at the top of the second substrate, respectively, a plurality of barrier ribs disposed between the first substrate and the second substrate to form a plurality of cells, electrophoretic particles injected in the cells, and a micro protrusion member formed at the bottom of each first electrode and/or at the top of each second electrode.

In another aspect of the present invention, an electronic paper display device includes a first substrate and a second substrate, which are disposed opposite to each other while the first substrate and the second substrate are spaced apart from each other, a plurality of first electrodes and a plurality of second electrodes formed at the bottom of the first substrate and at the top of the second substrate, respectively, a plurality of barrier ribs disposed between the first substrate and the second substrate to form a plurality of cells, and first and second electrophoretic particles injected in the cells, the first and second electrophoretic particles having different particle amounts.

In another aspect of the present invention, an electronic paper display device includes a first substrate and a second substrate, which are disposed opposite to each other while the first substrate and the second substrate are spaced apart from each other, a plurality of first electrodes and a plurality of second electrodes formed at the bottom of the first substrate and at the top of the second substrate, respectively, a plurality of barrier ribs disposed between the first substrate and the second substrate to form a plurality of cells, and first and second electrophoretic particles injected in the cells, the first and second electrophoretic particles having different particle diameters.

In another aspect of the present invention, an electronic paper display device includes a first substrate and a second substrate, which are disposed opposite to each other while the first substrate and the second substrate are spaced apart from each other, a plurality of first electrodes and a plurality of second electrodes formed at the bottom of the first substrate and at the top of the second substrate, respectively, the first electrodes and/or the second electrodes having protrusions, a plurality of barrier ribs disposed between the first substrate and the second substrate to form a plurality of cells, and electrophoretic particles injected in the cells.

In another aspect of the present invention, a manufacturing method of an electronic paper display device includes manufacturing a first structure, including forming a first electrode at the bottom of a first substrate and forming a first micro protrusion member at the bottom of the first electrode, manufacturing a second structure, including forming a second electrode at the top of a second substrate and forming a second micro protrusion member at the top of the second electrode, manufacturing barrier ribs at the top of the second structure to form cell spaces, injecting electrophoretic particles into the cell spaces to display pictures, and stacking and attaching the first structure and the second structure having the barrier ribs to each other.

In yet another aspect of the present invention, a driving method of an electronic paper display device includes designating a threshold voltage at which the light reflection rate of the electronic paper display device begins to be changed as V0 voltage, applying a base voltage to data and scan electrodes of the electronic paper display device such that the voltage difference corresponding to the magnitude of the designated V0 voltage is created at the data and scan electrodes, and generating data pulse and scan pulse necessary to drive cells of a panel from the base voltage applied to the data and scan electrodes so as to drive the electronic paper display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
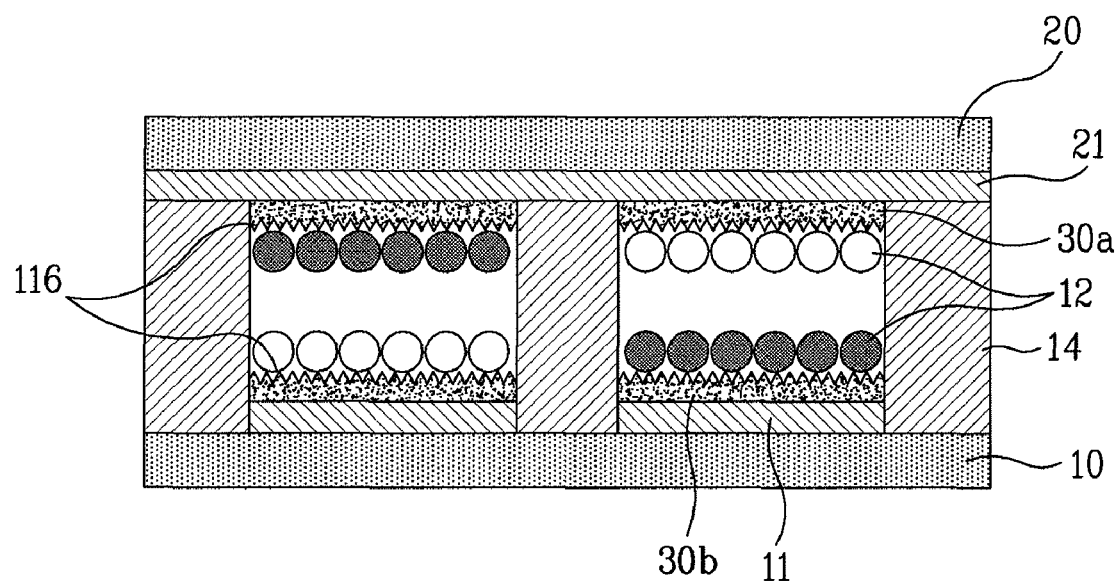
FIG. 4 is a sectional view illustrating an electronic paper display device according to an embodiment of the present invention.

FIG. 4 is a sectional view illustrating an electronic paper display device according to an embodiment of the present invention. As shown in FIG. 4, the electronic paper display device includes: a first structure having a first substrate 20, a first electrode 21 formed at the bottom of the first substrate 20, and a first micro protrusion member 30a formed at the bottom of the first electrode 21; a second structure, which is disposed opposite to the first structure while the second structure is spaced a predetermined distance from the first structure, having a second substrate 10, a second electrode 11 formed at the top of the second substrate 20, and a second micro protrusion member 30b formed at the top of the second electrode 11; barrier ribs 14 disposed between the first structure and the second structure to form cell spaces (pixel spaces); and electrophoretic particles 12 encapsulated in the respective cell spaces.

When the first and second micro protrusion members 30a and 30b are formed as described above, the contact area between the electrophoretic particles 12 and the first and second electrode 21 and 11 is reduced. As a result, it is possible to separate the electrophoretic particles 12 from the first and second electrode 21 and 11 even using lower driving voltage.

The first and second micro protrusion members 30 are one of the principal characteristics of the present invention. The material of the micro protrusion members 30 is not particularly restricted. However, it is preferable that the micro protrusion members 30 contain polymer or inorganic oxide. Preferably, the polymer may be polymethyl methacrylate (PMMA), polycarbonate (PC), polyethylene terephthalate (PET), polyimide (PI), or polystyrene (PS). Preferably, the inorganic oxide may be silicon dioxide ($SiO_2$), titanium dioxide ($TiO_2$), aluminum oxide ($Al_2O_3$), or zinc oxide (ZnO).

The first and second micro protrusion members 30 may be constructed such that the first and second micro protrusion members 30 entirely cover the first electrode 11 or the second electrode 21. The electrophoretic particles 12 exist only in the cell spaces. Consequently, it is more preferable that the first and second micro protrusion members 30 be disposed only in the cell spaces. The thickness of the first and second micro protrusion members is not particularly restricted. However, it is preferable that the thickness of the first and second micro protrusion members 30 be 10 nm to 10 μm.

Also, the first and second micro protrusion members 30 may be made of an insulating material, such as polymer or insulative inorganic oxide, so as to serve as insulating layers. In this case, it is possible to prevent the electrophoretic particles 12, which are electrified, from contacting the electrodes, and therefore, from being electrically discharged.

The first and second substrates 20 and 10 are made of a flexible material. For example, the first and second substrates 20 and 10 may be made of flexible glass or flexible plastic. Preferably, the first and second substrates 20 and 10 may be made of polycarbonate (PC), polyethylene terephthalate (PET), polyether sulfone (PES), or polyimide film (Kapton, Upilex). However, the material of the first and second substrates 20 and 10 is not restricted to the above-specified one so long as the material of the first and second substrates 20 and 10 is flexible.

Most preferably, the thickness of the first and second substrates 20 and 10 is approximately 0.05 to 0.5 mm, at which the first and second substrates 20 and 10 can be thinned while the first and second substrates 20 and 10 have a predetermined strength.

The first and second electrodes 21 and 11, which are formed at the corresponding first and second substrates 20 and 10, are made of a conductive material. All electrode materials commonly used in the art to which the present invention pertains may be used for the first and second electrodes 21 and 11. For example, the first and second electrodes 21 and 11 may be made of conductive polymer, such as polythiophene or polyaniline, a printed conductive material, such as polymer film containing metal particles such as silver or nickel, a conductive carbon material such as a graphite, or another printed conductive material, such as polymer film containing conductive oxide such as tin oxide or indium tin oxide. Alternatively, the first and second electrodes 21 and 11 may be made of indium tin oxide (ITO). More preferably, the first and second electrodes 21 and 11 are made of a transparent material. Also preferably, the first and second electrodes 21 and 11 have a thickness of 50 to 500 nm such that no resistance change occurs even at a strain rate of approximately 1.5%, when the first and second electrodes 21 and 11 are bent, and the first and second electrodes 21 and 11 can be securely attached to the corresponding substrates. The first and second electrodes 21 and 11 are arranged such that the first and second electrodes 21 and 11 intersect at right angles. The micro protrusion members may be formed integrally with the first electrode 21 or the second electrode 11.

The barrier ribs 14 may be made of the same material as the substrates. Alternatively, the barrier ribs 14 may be made of thick-film photoresist or a film-shaped photosensitive material such that the shape of the barrier ribs 14 can be accurately formed. Preferably, the barrier ribs 14 are made of a flexible material. For example, the barrier ribs 14 are made of polymer, such as polycarbonate (PC), polyethylene terephthalate (PET), polyether sulfone (PES), or polyimide film (Kapton, Upilex).

It is advantageous that the thickness of the barrier ribs 14 be as large as possible in consideration of required attachment strength between the upper and lower substrates. As a result, however, the opening rate may be reduced. Consequently, it is preferable that the thickness of the barrier ribs 14 be approximately 10 to 500 μm.

The electrophoretic particles 12 are used to display pictures. All electrophoretic particles used to display pictures may be used in the art to which the present invention pertains. Electrophoretic particles having different colors and electrification characteristics are selected. In order to display black and white, it is preferable that carbon black be used as black particles and titanium oxide be used as white particles. Electrified particles may be injected. During application of particles, the particles may be applied while the particles are electrified using corona discharge.

It is preferable to inject dry-type collision electrification electrophoretic particles in which unelectrified particles are injected, and voltage is applied to the first and second electrodes 21 and 11 such that the particles collide with each other, and therefore, the particles are charged due to the collision, thereby forming electrophoretic particles.

Figure 5:
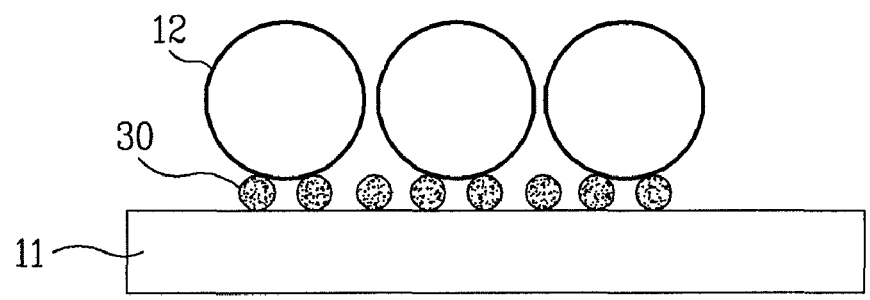
FIG. 5 is a sectional view, in part, illustrating the contact between electrophoretic particles and a micro protrusion member of an electronic paper display device according to an embodiment of the present invention.

FIG. 5 is a sectional view, in part, of the electronic paper display device according to the present invention, illustrating the contact between the micro protrusion member 30 and the electrophoretic particles 12, which are formed in a micro particle applying step of a micro protrusion member manufacturing method, which will be described below.

As shown in FIG. 5, the contact area of the electrophoretic particles 12 is reduced due to micro protrusions of the micro protrusion member 30 naturally formed by application of micro particles, and therefore, van der Waals force is reduced. Consequently, it is easy to separate the electrophoretic particles 12 from the first and second structures, thereby reducing driving voltage.

Figure 6A:
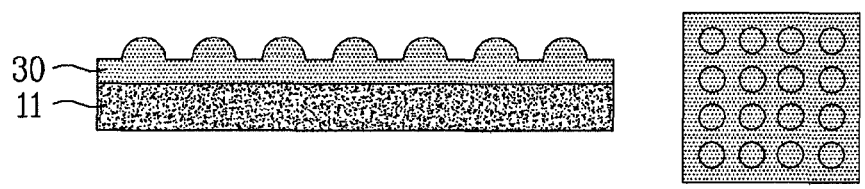
FIGS. 6A to 6C are enlarged sectional views illustrating a micro protrusion member of an electronic paper display device according to an embodiment of the present invention.
Figure 6B:
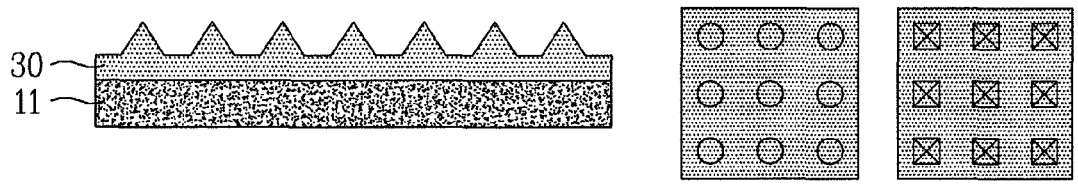
Figure 6C:
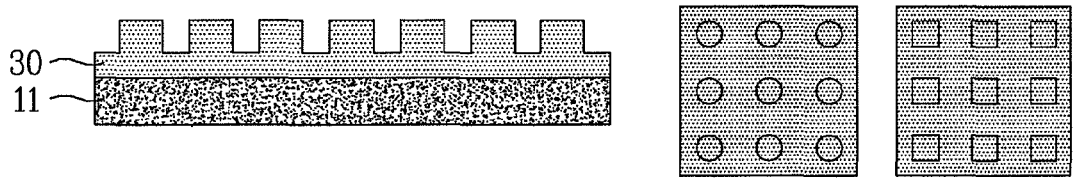
Figure 7A:
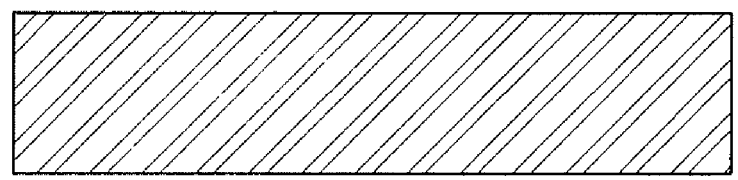
FIGS. 7A to 7D are views illustrating a part of a method of manufacturing an electronic paper display device according to an embodiment of the present invention.
Figure 7B:
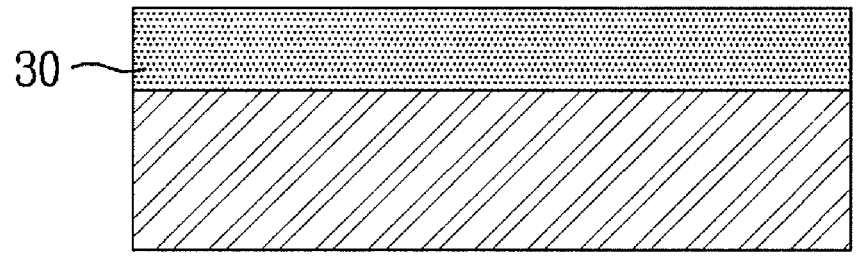
Figure 7C:
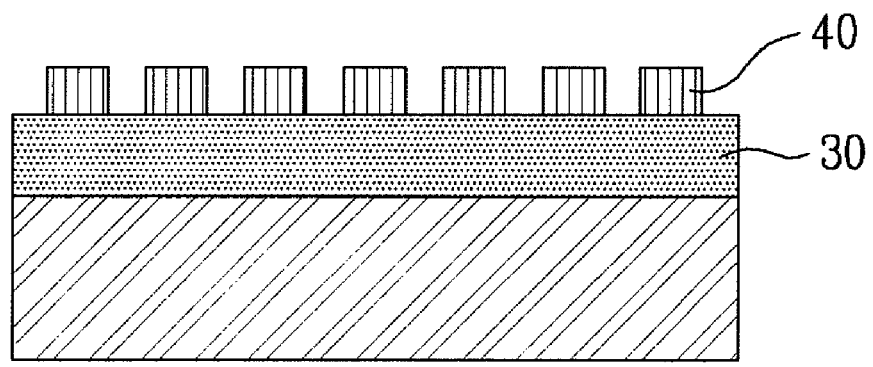
Figure 7D:
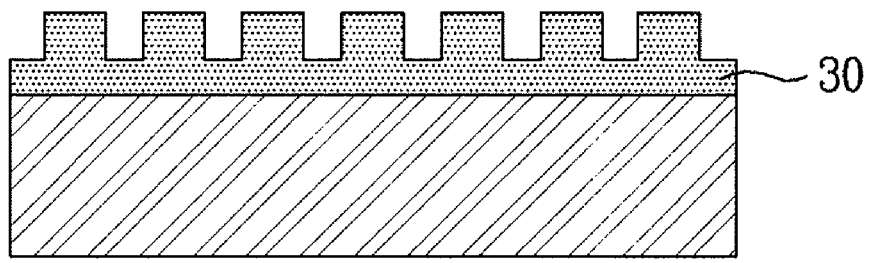

FIGS. 6A to 6C are sectional views and plan views illustrating the protrusion shape of the micro protrusion member 30 of the electronic paper display device according to the present invention.

The protrusion shape of the micro protrusion member 30 is not particularly restricted, and therefore, the micro protrusion member 30 may be constructed in various different protrusion shapes. Preferably, the micro protrusion member 30 may be constructed in a hemispherical protrusion shape (see FIG. 6A), in a conical or pyramidal protrusion shape (see FIG. 6B), in a cylindrical or prismatic protrusion shape (see FIG. 6C), or in a combination thereof.

Hereinafter, a method of manufacturing the electronic paper display device according to the present invention will be described with reference to FIGS. 4, 7A to 7D, and 8A to 8C.

The electronic paper display device manufacturing method according to the present invention includes: manufacturing a first structure, which includes forming a first electrode 21 at the bottom of a first substrate 20 and forming a first micro protrusion member 30a at the bottom of the first electrode 21; manufacturing a second structure, which includes forming a second electrode 11 at the top of a second substrate 10 and forming a second micro protrusion member 30b at the top of the second electrode 11; manufacturing barrier ribs 14 at the top of the second structure to form cell spaces (pixel spaces); injecting electrophoretic particles 12 into the cell spaces to display pictures; and stacking and attaching the first structure and the second structure having the barrier ribs 14 to each other.

First, the first and second electrodes 21 and 11 are formed on the first and second substrates 20 and 10, which is well known in the art to which the present invention pertains. Consequently, a detailed description thereof will not be given. Preferably, the first and second electrodes 21 and 11 may be formed on the first and second substrates 20 and 10 by a screen printing method or photolithography. Especially when the resolution is not high and the area is large, the first and second electrodes 21 and 11 may be formed on the first and second substrates 20 and 10 by screen printing liquid-phase indium tin oxide (ITO).

Subsequently, the micro protrusion members 30 are formed on the first and second electrodes 21 and 11, respectively, to complete the first structure and the second structure.

Any methods of forming micro protrusion members may be used without limits so long as it is possible to form the micro protrusion members 30. All possible micro protrusion forming methods are included in the scope of the present invention. Preferably, the micro protrusion members 30 are formed by addition, photolithography, or molding.

The addition is a method of applying micro particles on the electrodes to naturally form micro protrusion members. In order to more effectively apply the micro particles to the electrodes, the micro particles may be applied to the electrodes while the micro particles are mixed with a binder, such as polymer resin. Alternatively, a binder or a bonding agent, such as polymer resin, may be applied to the electrodes, and then, the micro particles may be applied to the binder or the bonding agent. The shape of the micro particles is not particularly restricted. Preferably, the micro particles may be constructed in the shape of a sphere, a prism, or a cylinder. More preferably, the micro particles may be constructed in the shape of a sphere. Preferably, the micro particles may have a size of 0.1 to 0.01 times the size of the electrophoretic particles 12. More preferably, the micro particles may have a size of 10 nm to 10 μm.

The micro particles may contain polymer or inorganic oxide. Preferably, the polymer may be polymethyl methacrylate (PMMA), polycarbonate (PC), polyethylene terephthalate (PET), polyimide (PI), or polystyrene (PS). Preferably, the inorganic oxide may be silicon dioxide ($SiO_2$), titanium dioxide ($TiO_2$), aluminum oxide ($Al_2O_3$), or zinc oxide (ZnO).

FIGS. 7A to 7D illustrate a method of forming the micro protrusion member 30 using photolithography. As shown in FIGS. 7A to 7D, the above-specified material is uniformly applied to the corresponding electrode to form the micro protrusion member 30 (see FIGS. 7A and 7B). Next, pattern masks are formed on the applied material using photoresist (PR) (see FIG. 7C). Subsequently, the micro protrusion member 30 is completed by dry etching or wet etching (see FIG. 7D) The protrusion shape of the micro protrusion member 30 may be varied depending upon the pattern shape of the photoresist. Photolithography is advantageous in terms of high precision.

Figure 8A:
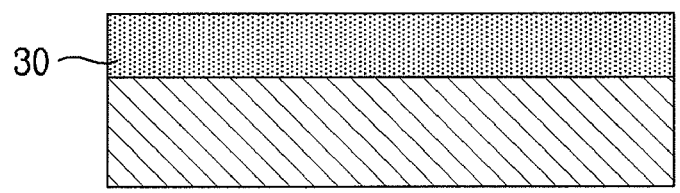
FIGS. 8A to 8C are views illustrating a part of a method of manufacturing an electronic paper display device according to an embodiment of the present invention.
Figure 8B:
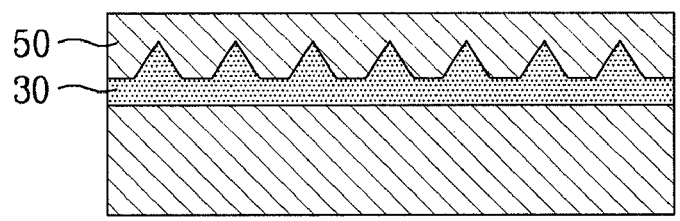
Figure 8C:
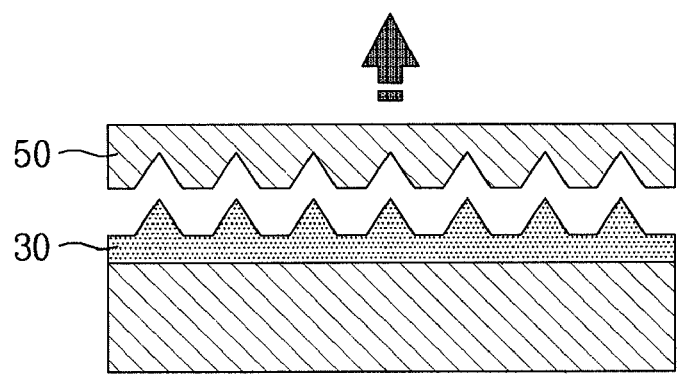

FIGS. 8A to 8C illustrate a method of forming the micro protrusion member 30 using molding. As shown in FIGS. 8A to 8C, the above-specified material is uniformly applied to the corresponding electrode to form the micro protrusion member 30 (see FIG. 8A). Next, the applied material is pressed using a mold 50 having predetermined grooves (see FIG. 8B). Subsequently, the mold 50 is removed (see FIG. 8C). In this way, it is possible to realize various protrusion shapes of the micro protrusion member. While the material is pressed using the mold, the material may be heated. Alternatively, the material may be placed in the mold to form the material into a predetermined shape, and then the molded material may be attached to the first electrode 21 or the second electrode 11.

After the micro protrusion member 30 is completed, the barrier ribs 14 are formed above the second structure to form the pixel spaces. The barrier ribs 14 may be formed by photolithography. Alternatively, material film for the barrier ribs 14 is uniformly applied, and is then pressed using a specific press, whereby the barrier ribs 14 are formed. Preferably, a plurality of presses are arranged at regular intervals so as to form a plurality of barrier ribs each time. The barrier ribs 14 may be directly formed by forming material film on the second electrode 11 and pressing the material film. Alternatively, the barrier ribs 14 may be separately formed, and may be attached to the second electrode 11. It is possible to mass-produce the barrier ribs using the pressing method, and therefore, it is possible to simplify the manufacturing process and reduce the manufacturing costs.

Subsequently, the electrophoretic particles 12 are injected into the pixel spaces and applied to display pictures. For example, the electrophoretic particles 12 may be injected and applied by a spraying method, a screen printing method, a roll coating method, or a spin coating method. However, the electrophoretic particle injecting and applying method is not limited to the above-specified methods. Any methods may be used without limits so long as the electrophoretic particles 12 can be injected into the cell spaces.

After all the electrophoretic particles 12 are injected, ultraviolet-setting adhesive is applied to the top of the barrier ribs 14, and the first substrate 20 having the first electrode 21 is stacked on the barrier ribs 14. Subsequently, ultraviolet rays are irradiated such that the first substrate 20 is securely attached to the barrier ribs 14. As a result, the electrophoretic particles 12 are encapsulated in the cells.

In the case that the injected electrophoretic particles 12 are collision electrification electrophoretic particles, the electrophoretic particles 12 are injected in the pixel spaces while the electrophoretic particles 12 are not electrified. For this reason, after the first substrate 20 is securely attached to the barrier ribs 14, voltage is applied to the first and second electrodes 21 and 11 such that the electrophoretic particles 12 collide with each other. As a result, the electrophoretic particles are charged due to the collision, and therefore, the electronic paper display device is completed.

The above-described embodiment is given to describe the present invention in detail such that the present invention can be more easily understood, not to limit the present invention. Accordingly, all possible electronic paper display devices which can be commonly modified are included in the scope of the present invention.

Figure 9:
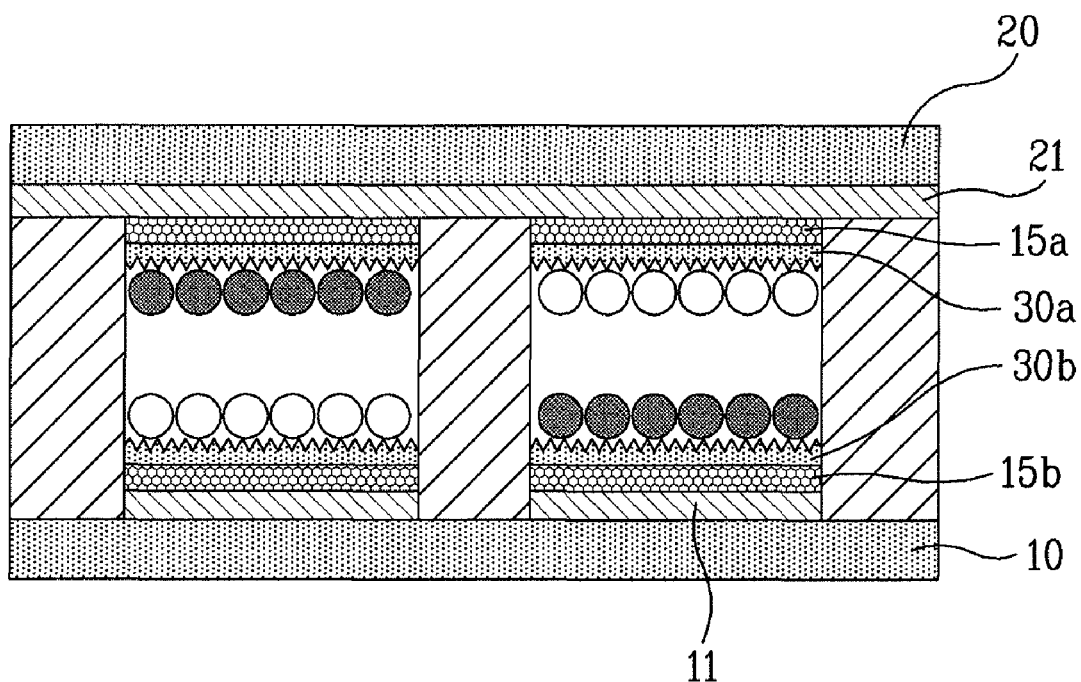
FIG. 9 is a sectional view illustrating an electronic paper display device according to a modification of the present invention.

FIG. 9 is a sectional view illustrating an electronic paper display device, having insulating layers 15, according to a modification of the present invention. Specifically, the insulating layers 15 are disposed between the first electrode 21 and/or the second electrode 11 and the corresponding micro protrusion members to prevent the electrified electrophoretic particles 12 from being discharged.

The insulating layers 15 are formed using sputtering, chemical vapor deposition (CVD), vacuum deposition, coating, or printing. The insulating layers 15 have a thickness of 0.01 to 10 μm, although the thickness of the insulating layers 15 is not particularly restricted. Preferably, the insulating layers 15 are made of a transparent material. For example, the insulating layers 15 may be made of silicon oxide, silicon nitride, silicon carbide, aluminum oxide, or tantalum oxide ($Ta_2O_3$). Alternatively, the insulating layers 15 may be made of copolymer resin. The second insulating layer 15b, i.e., the lower insulating layer 15b, may be naturally formed at the time of forming the barrier ribs 14. Specifically, when the barrier ribs 14 are formed using the press, the insulating layer is integrally formed with the barrier ribs such that the lower surfaces of the pixel spaces have a predetermined thickness, whereby the lower surfaces of the pixel spaces perform insulation function.

Figure 10:
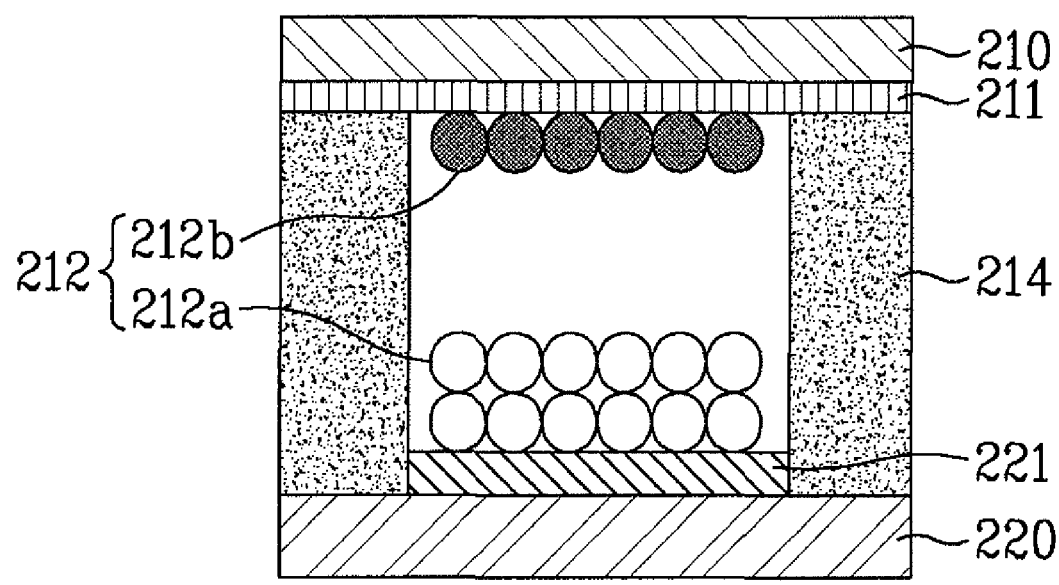
FIG. 10 is a sectional view illustrating an electrophoretic display device according to an embodiment of the present invention.

FIG. 10 is a sectional view illustrating an electrophoretic display device according to an embodiment of the present invention. As shown in FIG. 10, the electrophoretic display device according to the present invention includes a plurality of first electrodes 211 formed at the bottom of a first substrate 210, a plurality of second electrodes 221 formed at the top of a second substrate 220, which is opposite to the first substrate 210, a plurality of barrier ribs 214 disposed between the first substrate 210 and the second substrate 220 to form a plurality of cells between the first substrate 210 and the second substrate 220, and two kinds of electrophoretic particles 212 having different amounts of particles injected into the cells. The electrophoretic display device may further include insulating layers (not shown) to cover the first electrode 211 and the second electrode 221.

The two kinds of electrophoretic particles 212 collide with each other with the result that the two kinds of electrophoretic particles 212 are electrified with different polarities. At this time, the electrification amount depends on the amount of two kinds of particles. Specifically, when the amounts of the two kinds of particles injected are the same, the electrification amounts of the two kinds of particles are the same while the two kinds of particles have opposite polarities. As a result, when the electrification amounts of the two kinds of particles are added, the electrification amounts become zero.

According to the electrophoretic display device according to the present invention, however, when the amounts of the two kinds of electrophoretic particles injected into the cells are different from each other, as shown in FIG. 10, the electrification amounts of the two kinds of electrophoretic particles are changed. As a result, the electrophoretic particles of one kind are excessively electrified. For example, when the amounts of black and white electrophoretic particles injected are changed from 1:1 to 1:2 (or vice versa), as shown in FIG. 10, the black electrophoretic particles 212b, the injection amount of which is small, are relatively excessively electrified, and therefore, electrophoresis occurs even at a low electric field. As a result, driving voltage is lowered.

Preferably, the weight ratio of the electrophoretic particles 212a, the injection amount of which is large, to the electrophoretic particles 212b, the injection amount of which is small, is 1.2:1 to 5:1. When the weight ratio is less than 1.2:1, the driving voltage reduction effect is insignificant. When the weight ratio is greater than 5:1, on the other hand, the electrification amount of the electrophoretic particles which are a little electrified is insignificant, and therefore, it is difficult to display pictures.

The two kinds of electrophoretic particles, the injection amounts of which are different, may have the same particle size. Alternatively, in order to further increase the driving voltage reduction effect, the particle size of the electrophoretic particles 212b, the injection amount of which is small, may be greater than the particle size of the electrophoretic particles 212a, the injection amount of which is large.

The first and second substrates 210 and 220 are made of a flexible material. For example, the first and second substrates 210 and 220 may be made of flexible glass or flexible plastic. Preferably, the first and second substrates 210 and 220 may be made of polycarbonate (PC), polyethylene terephthalate (PET), polyether sulfone (PES), or polyimide film (Kapton, Upilex). However, the material of the first and second substrates 210 and 220 is not restricted to the above-specified one so long as the material of the first and second substrates 210 and 220 is flexible.

Most preferably, the thickness of the first and second substrates 210 and 220 is approximately 0.05 to 0.5 mm, at which the first and second substrates 210 and 220 can be thinned while the first and second substrates 210 and 220 have a predetermined strength.

The first and second electrodes 211 and 221, which are formed at the corresponding first and second substrates 210 and 220, are made of a conductive material. All electrode materials commonly used in the art to which the present invention pertains may be used for the first and second electrodes 211 and 221. For example, the first and second electrodes 211 and 221 may be made of conductive polymer, such as polythiophene or polyaniline, a printed conductive material, such as polymer film containing metal particles such as silver or nickel, a conductive carbon material such as a graphite, or another printed conductive material, such as polymer film containing conductive oxide such as tin oxide or indium tin oxide. Alternatively, the first and second electrodes 211 and 221 may be made of indium tin oxide (ITO). More preferably, the first and second electrodes 211 and 221 are made of a transparent material. Also preferably, the first and second electrodes 211 and 221 have a thickness of 50 to 500 nm such that no resistance change occurs even at a strain rate of approximately 1.5%, when the first and second electrodes 211 and 221 are bent, and the first and second electrodes 211 and 221 can be securely attached to the corresponding substrates. The first and second electrodes 211 and 221 are arranged such that the first and second electrodes 211 and 221 intersect at right angles.

The barrier ribs 214 may be made of the same material as the substrates. Alternatively, the barrier ribs 214 may be made of thick-film photoresist or a film-shaped photosensitive material such that the shape of the barrier ribs 214 can be accurately formed. Preferably, the barrier ribs 214 are made of a flexible material. For example, the barrier ribs 214 are made of polymer, such as polycarbonate (PC), polyethylene terephthalate (PET), polyether sulfone (PES), or polyimide film (Kapton, Upilex).

It is advantageous that the thickness of the barrier ribs 214 be as large as possible in consideration of required attachment strength between the upper and lower substrates. As a result, however, the opening rate may be reduced. Consequently, it is preferable that the thickness of the barrier ribs 214 be approximately 10 to 500 µm.

The electrophoretic particles 212 are used to display pictures. All electrophoretic particles used to display pictures may be used in the art to which the present invention pertains. Electrophoretic particles having different colors and electrification characteristics are selected. In order to display black and white, it is preferable that carbon black be used as black particles and titanium oxide be used as white particles. Electrified particles may be injected. During application of particles, the particles may be applied while the particles are electrified using corona discharge.

It is preferable to inject dry-type collision electrification electrophoretic particles in which unelectrified particles are injected, and voltage is applied to the first and second electrodes 211 and 221 such that the particles collide with each other, and therefore, the particles are charged due to the collision, thereby forming electrophoretic particles.

The construction of the dry-type electrophoretic particles is not particularly restricted. However, it is preferable that the dry-type electrophoretic particles have the following construction. Specifically, it is preferable that an outer additive agent be coated on the outside of polymer resin containing an electric charge controlling agent and a coloring agent to make black color or white color. The outer additive agent may be physically or chemically coated thereon. Preferably, the outer additive agent is made of silicon dioxide ($SiO_2$), although the material of the outer additive agent is not particularly restricted.

The polymer resin may be urethane-based resin, nylon-based resin, fluorine-based resin, silicon-based resin, melamine-based resin, phenol-based resin, styrene-based resin, styrene acryl-based resin, or urethane acryl-based resin. However, the polymer resin is not limited to the above-specified resin. The preferable polymer resin may include polymethyl methacrylate (PMMA), polyethylene terephthalate (PET), polystyrene (PS), polyethylene, polypropylene, phenol resin, ethylene-vinyl acetate copolymer (Elvax resin—DuPont), polyester, polyacrylate, polymethacrylate, ethylene-acrylate or ethylene-methacrylate copolymer (Nucrel Resin—DuPont, Primacor Resin—Dow Chemical), acrylate copolymer, and terpolymer (Elvacite Resin—DuPont). Also, homopolymer having a high shear melting point and/or material useful in phase separation of pigment, as copolymer thereof, includes, but is not limited to, polyethylene, polypropylene, polymethyl methacrylate, polyisobutyl methacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymer of the above-specified two or more materials.

Especially, acrylic urethane resin, acrylic silicon resin, fluoroarcylic resin, arcrylic urethane silicon resin, fluoroarcylic urethane resin, fluorine resin, and silicon resin are suitable in terms of controlling the attaching force between the electrophoretic particles and the substrates.

Also, nylon resin, epoxy resin, or arcrylic styrene resin is suitable for a positive electrification resin, whereas fluorine resin, silicon resin, or fluoroarcylic urethane resin is suitable for a negative electrification resin.

The black pigment for the coloring agent includes carbon black, copper oxide, manganese dioxide, aniline black, and active carbon. Preferably, the white pigment for the coloring agent includes titanium oxide ($TiO_2$).

The electric charge controlling agent is used to provide good electrical mobility to the electrophoretic particles. The electric charge controlling agent may include, but is not limited to, metal soap, OLOA series, Ganex series, or a mixture thereof. For example, a negative charge controlling agent may include a salicylic metal complex, azo dye containing metal, useful dye containing metal (including metal ion or metal atom), quaternary ammonium salt compound, calixarene compound, boron compound (benzillic boron complex), and nitroimidazol derivatives. For example, a positive charge controlling agent may include negrocin dye, triphenyl methane compound, quaternary ammonium salt compound, polyamine resin, and imidazole derivatives. In addition, metal oxide, such as super micro silicon dioxide, super micro titanium oxide, and super micro aluminum oxide, annular nitric compound, such as pyridine, and derivatives there of, and resin including salt, various organic pigments, fluorine, chloride, and nitrogen may be used as the electric charge controlling agent.

The insulating layers, which may be further included, prevent the electrified electrophoretic particles 212 from being discharged.

The insulating layers are formed using sputtering, chemical vapor deposition (CVD), vacuum deposition, coating, or printing. The insulating layers have a thickness of 0.01 to 10 μm, although the thickness of the insulating layers 15 is not particularly restricted. Preferably, the insulating layers are made of a transparent material. For example, the insulating layers may be made of silicon oxide, silicon nitride, silicon carbide, aluminum oxide, or tantalum oxide ($Ta_2O_3$). Alternatively, the insulating layers 15 may be made of copolymer resin.

FIGS. 11A to 11D are views illustrating the movement of the electrophoretic particles depending upon the driving of the electrophoretic display device according to the present invention.

Figure 11A:
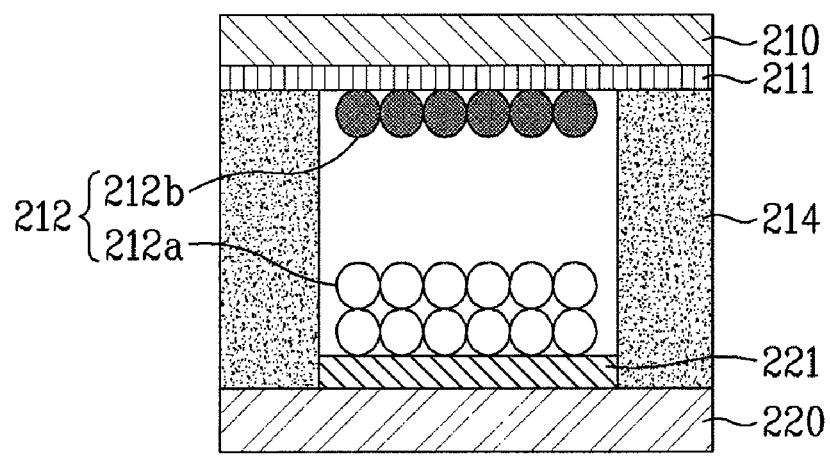
FIGS. 11A to 11D are views illustrating a picture realizing method of an electrophoretic display device according to an embodiment of the present invention.
Figure 11B:
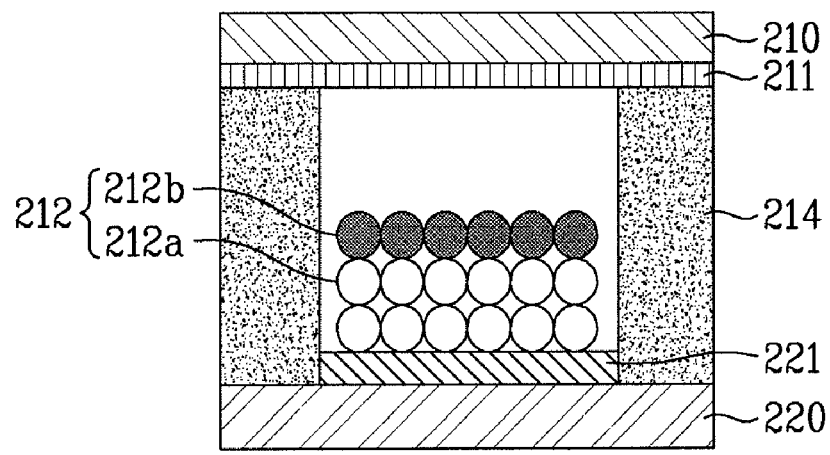
Figure 11C:
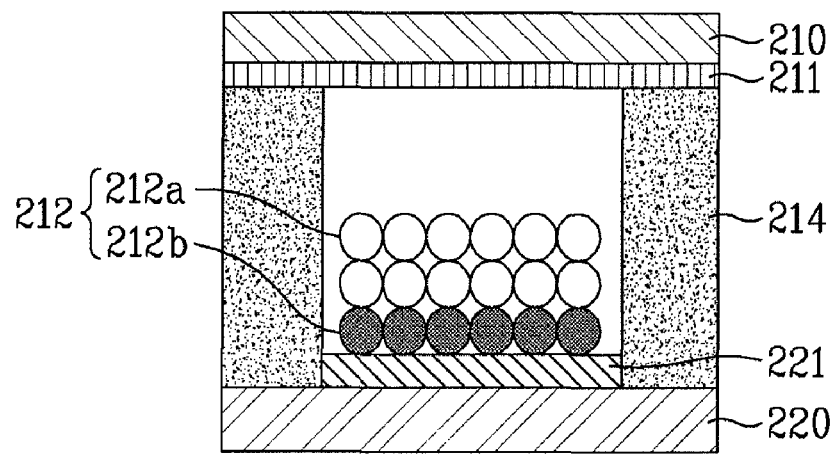
Figure 11D:
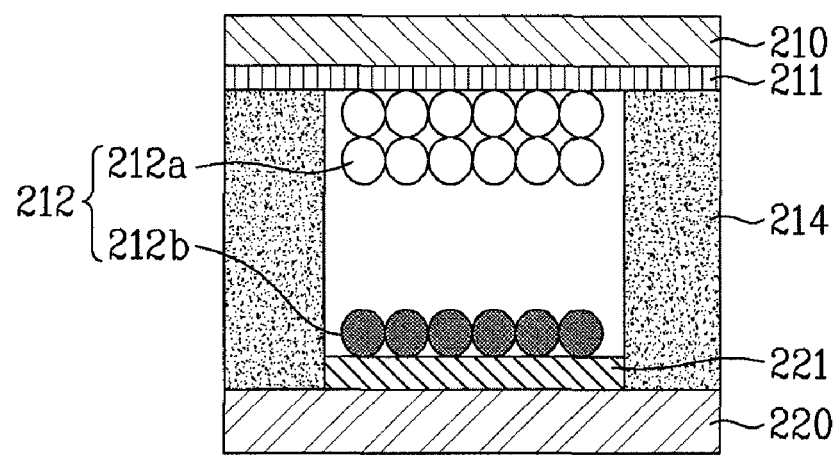

When driving voltage is applied between the two electrodes, between which particles exist, in the state that no voltage is applied, as shown in FIG. 11A, the black particles 212b, the injection amount of which is small, and therefore, which are excessively electrified, are separated from the first electrode, and move to the second electrode (see FIG. 11B). After that, the exchange between the white particles 212a and the excessively electrified black particles 212b is performed on the second electrode, as shown in FIG. 11C. As a result, the white particles 212a move to the first electrode (see FIG. 11D). Consequently, the driving voltage of the electrophoretic display device is lowered.

Figure 12:
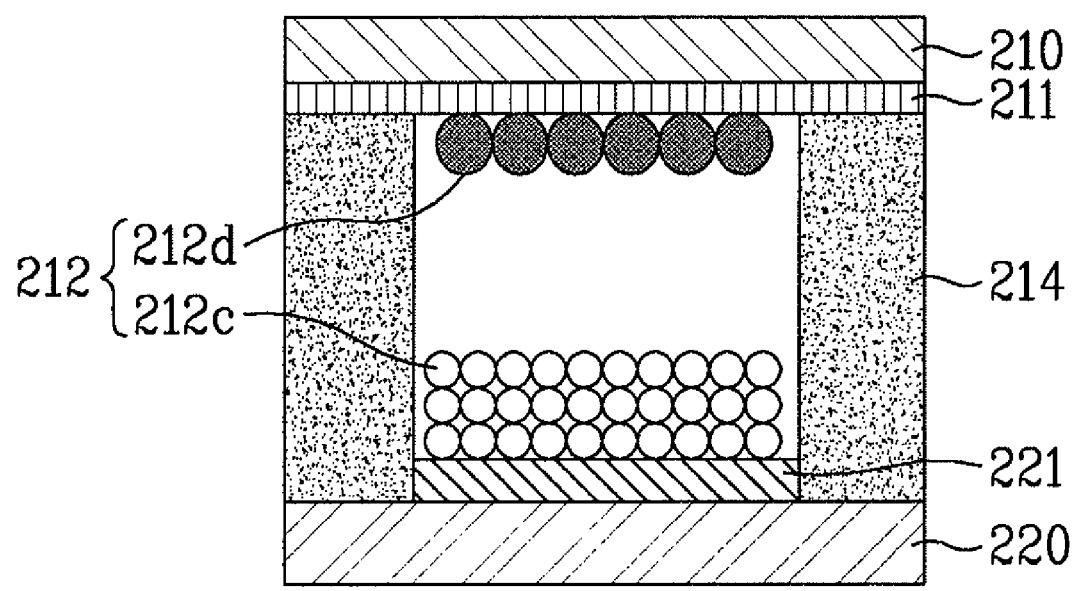
FIG. 12 is a sectional view illustrating an electrophoretic display device according to an embodiment of the present invention.

FIG. 12 is a sectional view illustrating an electrophoretic display device according to another embodiment of the present invention.

As shown in FIG. 12, the electrophoretic display device according to the present invention includes a plurality of first electrodes 211 formed at the bottom of a first substrate 210, a plurality of second electrodes 221 formed at the top of a second substrate 220, which is opposite to the first substrate 210, a plurality of barrier ribs 214 disposed between the first substrate 210 and the second substrate 220 to form a plurality of cells between the first substrate 210 and the second substrate 220, and two kinds of electrophoretic particles 212 having different diameters of particles injected into the cells. The electrophoretic display device may further include insulating layers (not shown) to cover the first electrode 211 and the second electrode 221.

The electrification amount of the two kinds of electrophoretic particles 212 depends on the particle size, i.e., the particle diameter, of two kinds of particles. Specifically, when the amounts of the two kinds of particles injected are the same, and the particle diameters of the two kinds of particles injected are the same, the electrification amounts of the two kinds of particles are the same while the two kinds of particles have opposite polarities.

According to the electrophoretic display device according to the present invention, however, when the particle diameters of the two kinds of electrophoretic particles are different from each other, as shown in FIG. 12, the total particle surface area of the electrophoretic particles having the small particle diameter is relatively small. As a result, the electrophoretic particles having the small particle diameter are excessively electrified. For example, when the particle diameters of black and white electrophoretic particles are changed from 1:1 to 1:2 (or vice versa), as shown in FIG. 12, the black electrophoretic particles, the particle diameter of which is small, are relatively excessively electrified, and therefore, electrophoresis occurs even at a low electric field. As a result, driving voltage is lowered.

Other constructions of the electrophoretic display device according to this embodiment are identical to those of the electrophoretic display device according to the previous embodiment except that the particle diameters of the electrophoretic particles are different from each other. Accordingly, a further detailed description of the electrophoretic display device will not be given.

Preferably, the particle diameter ratio of the electrophoretic particles 212d, the particle diameter of which is large, to the electrophoretic particles 212c, the particle diameter of which is small, is 1.2:1 to 5:1. When the particle diameter ratio is less than 1.2:1, the driving voltage reduction effect is insignificant. When the particle diameter ratio is greater than 5:1, on the other hand, the electrification amount of the electrophoretic particles which are a little electrified is insignificant, and therefore, it is difficult to display pictures.

The two kinds of electrophoretic particles, the particle diameters of which are different, may have the same injection amount. Alternatively, in order to further increase the driving voltage reduction effect, the particle injection amount of the electrophoretic particles 212d, the particle diameter of which is large, may be less than the particle injection amount of the electrophoretic particles 212c, the particle diameter of which is small.

FIGS. 13A to 13D are views illustrating the movement of the electrophoretic particles depending upon the driving of the electrophoretic display device according to the present invention.

Figure 13A:
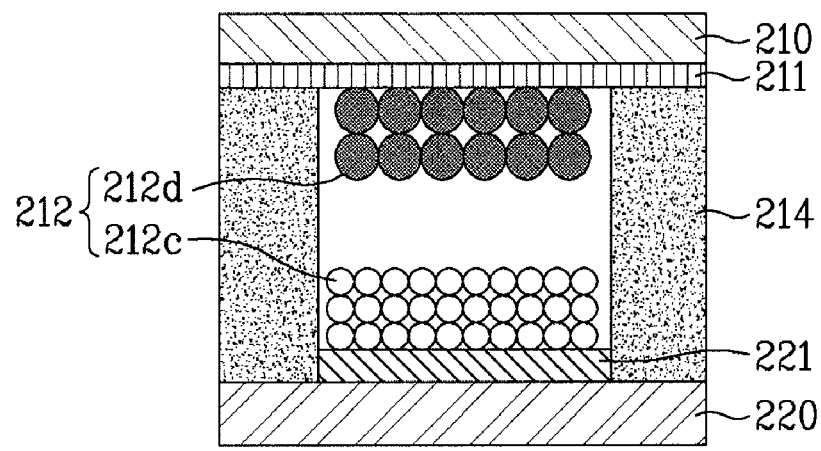
FIGS. 13A to 13D are views illustrating a picture realizing method of an electrophoretic display device according to an embodiment of the present invention.
Figure 13B:
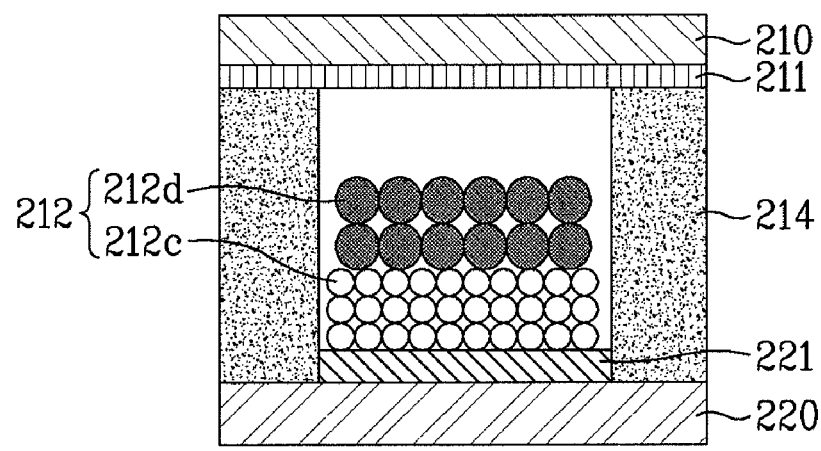
Figure 13C:
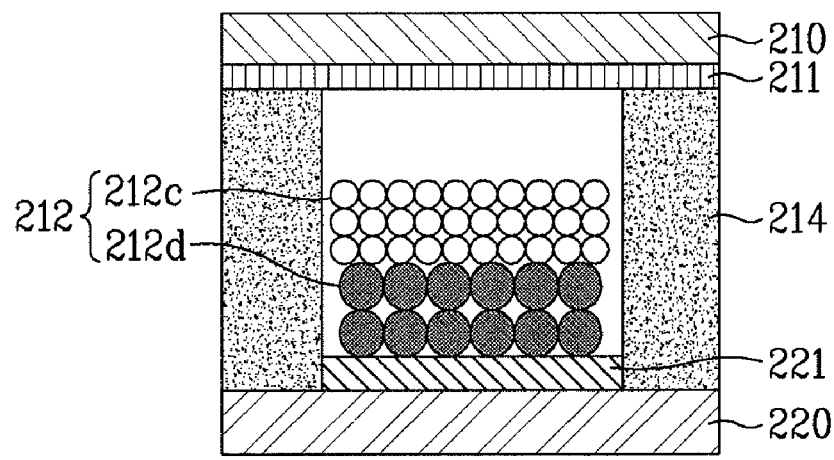
Figure 13D:
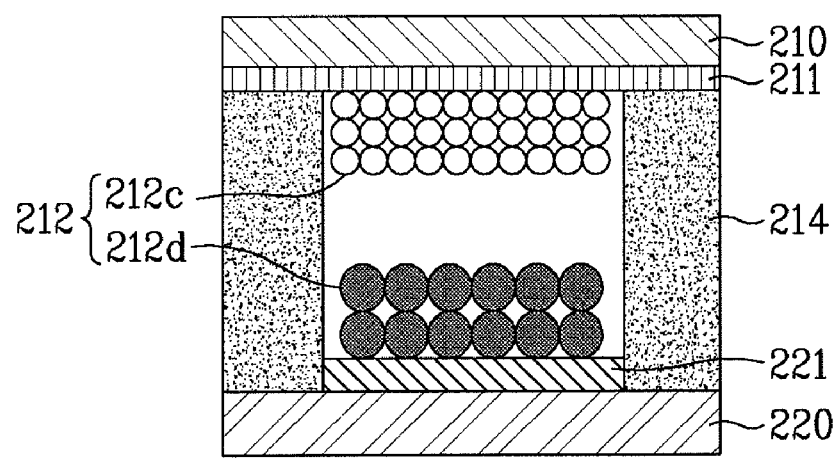

When driving voltage is applied between the two electrodes, between which particles exist, in the state that no voltage is applied, as shown in FIG. 13A, the black particles 212d, the particle diameter of which is relatively large, and therefore, which are excessively electrified, are separated from the first electrode 211, and move to the second electrode 221 (see FIG. 13B). After that, the exchange between the white particles 212c and the excessively electrified black particles 212d is performed on the second electrode 221, as shown in FIG. 13C. As a result, the white particles 212c move to the first electrode 211 (see FIG. 13D). Consequently, the driving voltage of the electrophoretic display device is lowered.

Figure 14:
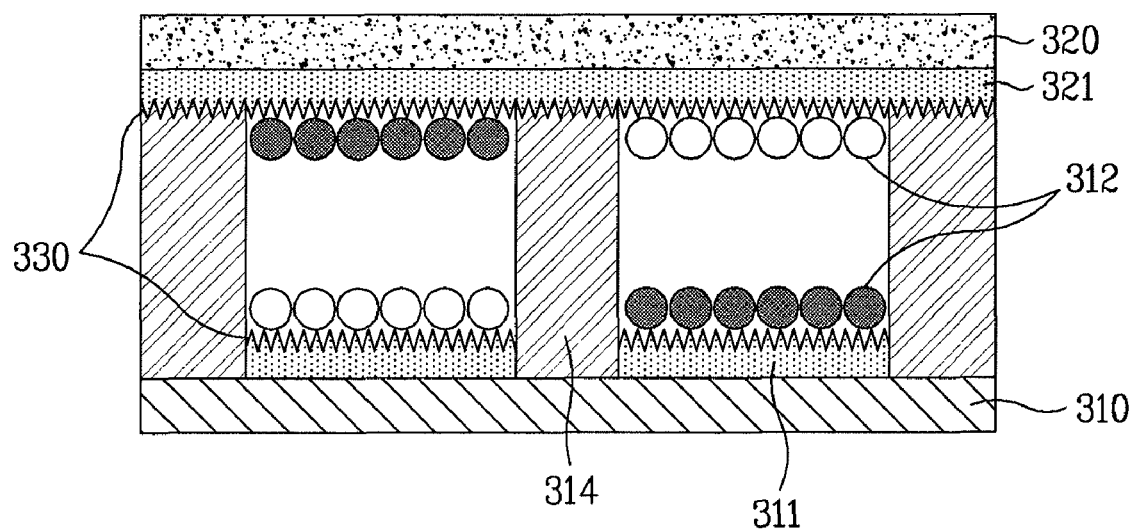
FIG. 14 is a sectional view illustrating an electronic paper display device according to an embodiment of the present invention.

FIG. 14 is a sectional view illustrating an electronic paper display device according to an embodiment of the present invention.

As shown in FIG. 14, the electronic paper display device includes first and second electrodes 321 and 311 formed at the inner surfaces of first and second substrates 320 and 310, which are opposite to each other while being spaced apart from each other, and electrophoretic particles 312 encapsulated in cell (pixel) spaces defined between the first electrode 321 and the second electrode 311. In this embodiment, a plurality of protrusions 330 are formed at least one of the first and second electrodes 321 and 311. The electronic paper display device may further include barrier ribs 314 (which may be omitted) disposed between the first electrode 321 and the second electrode 311 to barrier rib pixels. In addition, the electronic paper display device may further include an insulating layer (not shown) disposed at the bottom of the first electrode 321 or at the top of the second electrode 311.

In the case that the plurality of protrusions 330 are formed at the corresponding electrode, a strong electric field is distributed around the electrode (or the insulating layer) at which the particles are located in the initial stage of movement. Consequently, it is possible to separate the electrophoretic particles from the electrode and to move the separated electrophoretic particles even at low driving voltage.

The construction of the electronic paper display device according to the present invention will be described hereinafter in more detail.

The first and second substrates 320 and 310 are made of a flexible material. For example, the first and second substrates 320 and 310 may be made of flexible glass or flexible plastic. Preferably, the first and second substrates 320 and 310 may be made of polycarbonate (PC), polyethylene terephthalate (PET), polyether sulfone (PES), or polyimide film (Kapton, Upilex). However, the material of the first and second substrates 320 and 310 is not restricted to the above-specified ones so long as the material of the first and second substrates 320 and 310 is flexible.

Most preferably, the thickness of the first and second substrates 320 and 310 is approximately 0.05 to 0.5 mm, at which the first and second substrates 320 and 310 can be thinned while the first and second substrates 320 and 310 have a predetermined strength.

The first and second electrodes 321 and 311 are made of a conductive material. All electrode materials commonly used in the art to which the present invention pertains may be used for the first and second electrodes 321 and 311. For example, the first and second electrodes 321 and 311 may be made of conductive polymer, such as polythiophene or polyaniline, a printed conductive material, such as polymer film containing metal particles such as silver or nickel, a conductive carbon material such as a graphite, another printed conductive material, such as polymer film containing conductive oxide such as tin oxide or indium tin oxide, or conductive metal. More preferably, the first and second electrodes 321 and 311 are made of a transparent material, such as indium tin oxide (ITO). Also preferably, the first and second electrodes 21 and 11 have a thickness of 50 to 500 nm such that no resistance change occurs even at a strain rate of approximately 1.5%, when the first and second electrodes 321 and 311 are bent, and the first and second electrodes 321 and 311 can be securely attached to the corresponding substrates. The first and second electrodes 321 and 311 are arranged such that the first and second electrodes 321 and 311 intersect at right angles.

One of the principal characteristics of the present invention is that the plurality of protrusions 330 are formed at least one of the first and second electrodes 321 and 311. The plurality of protrusions 330 are made of a conductive material. The protrusions 330 may be made of any electrode material commonly used in the art to which the present invention pertains, and materials may be selected for the upper and lower electrodes without limits.

The protrusions 330 may be formed at the first and second electrodes 321 and 311 by photolithography or a molding method.

When photolithography is used, conductive material is uniformly applied to the corresponding electrode to form the protrusions 330. Next, pattern masks are formed on the applied material using photoresist (PR). Subsequently, the protrusions 330 are completed by dry etching or wet etching. The protrusion shape of the protrusions 330 may be varied depending upon the pattern shape of the photoresist. Photolithography is advantageous in terms of high precision.

When the molding method is used, the above-specified material is uniformly applied to the corresponding electrode to form the protrusions 330. Next, the applied material is pressed using a mold having predetermined grooves. Subsequently, the mold is removed. In this way, it is possible to realize various shapes of the protrusions. While the material is pressed using the mold, the material may be heated. Alternatively, the material may be placed in the mold to form the material into a predetermined shape, and then the molded material may be attached to the first electrode 321 or the second electrode 311.

More preferably, the plurality of protrusions 330 may be integrally formed with the first electrode or the second electrode. Specifically, the first electrode or the second electrode may be etched in a predetermined pattern using wet-type etching or dry-type etching, such as reactive ion etching (RIE) such that the protrusions are integrally formed at the first electrode or the second electrode. The wet-type etching or the dry-type etching is well known in the art to which the present invention pertains. Consequently, a detailed description thereof will not be given.

The protrusions 330 may be formed in various different shapes without limits.

Figure 15A:
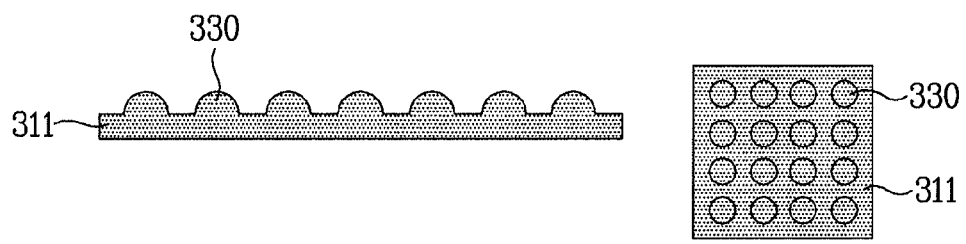
FIGS. 15A to 15C are sectional views and plan views illustrating an electrode, having protrusions, of an electronic paper display device according to an embodiment of the present invention.
Figure 15B:
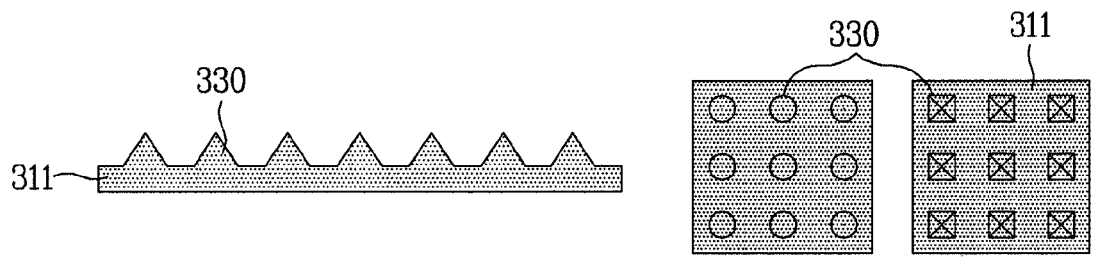
Figure 15C:
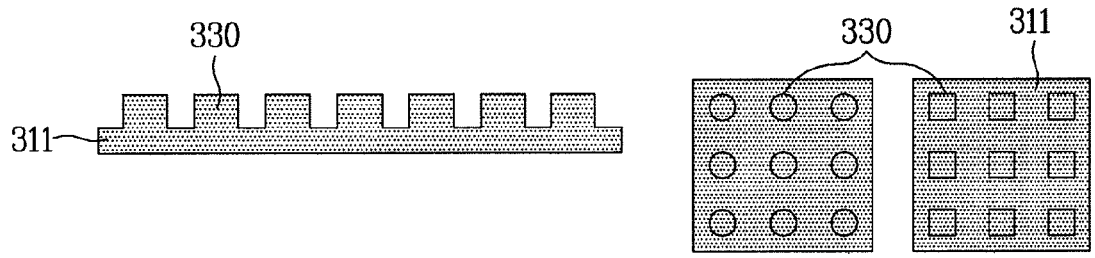

FIGS. 15A to 15C are sectional views and plan views illustrating various different shapes of the protrusions 330 of an electrode of the electronic paper display device according to the present invention. Preferably, the protrusions 330 may be formed in a hemispherical shape (see FIG. 15A), in a conical or pyramidal shape (see FIG. 15B), in a cylindrical or prismatic shape (see FIG. 15C), or in a combination thereof.

The barrier ribs 314 may be made of the same material as the substrates. Alternatively, the barrier ribs 314 may be made of thick-film photoresist or a film-shaped photosensitive material such that the shape of the barrier ribs 314 can be accurately formed. Preferably, the barrier ribs 314 are made of a flexible material. For example, the barrier ribs 314 are made of polymer, such as polycarbonate (PC), polyethylene terephthalate (PET), polyether sulfone (PES), or polyimide film (Kapton, Upilex).

It is advantageous that the thickness of the barrier ribs 314 be as large as possible in consideration of required attachment strength between the upper and lower substrates. As a result, however, the opening rate may be reduced. Consequently, it is preferable that the thickness of the barrier ribs 314 be approximately 10 to 500 µm.

Microcapsules may be used to encapsulate the electrophoretic particles 312. In this case, the barrier ribs may be omitted.

The electrophoretic particles 312 are used to display pictures. Two kinds of particles having different colors and electrification characteristics are encapsulated. Unelectrified particles may be injected. Kind of electrophoretic particles 312 is not particularly restricted. All kinds of electrophoretic particles 312 may be selected so long as the electrophoretic particles 312 can be used to display pictures in the electronic paper display device. Specifically, although not shown, an electrolytic solution, suspension, sol, gel, microcapsules, twisted balls, and electrochromic material as well as solids may be included.

It is preferable to inject dry-type electrophoretic particles having no viscosity, such as liquid or suspension. Specifically, it is preferable to inject dry-type collision electrification electrophoretic particles in which unelectrified particles are injected, and voltage is applied to the first and second electrodes such that the particles collide with each other, and therefore, the particles are charged due to the collision, thereby forming electrophoretic particles. In order to display black and white, it is also preferable that carbon black be used as black particles and titanium oxide be used as white particles.

The construction of the dry-type electrophoretic particles is not particularly restricted. However, it is preferable that the dry-type electrophoretic particles have the following construction. Specifically, it is preferable that an outer additive agent be coated on the outside of polymer resin containing an electric charge controlling agent and pigment or dye. The outer additive agent may be physically or chemically coated thereon. Preferably, the outer additive agent is made of silicon dioxide ($SiO_2$), although the material of the outer additive agent is not particularly restricted.

The polymer resin may include, but is not limited to, polymethyl methacrylate (PMMA), polyethylene terephthalate (PET), polystyrene (PS), polyethylene, polypropylene, phenol resin, ethylene-vinyl acetate copolymer (Elvax resin—DuPont), polyester, polyacrylate, polymethacrylate, ethylene-acrylate or ethylene-methacrylate copolymer (Nucrel Resin—DuPont, Primacor Resin—Dow Chemical), acrylate copolymer, and terpolymer (Elvacite Resin—DuPont).

The pigment or the dye may be commonly usable pigment, polymer, lake, or a combination thereof. Preferably, carbon black may be selected to display black, and titanium oxide may be selected to display white.

The electric charge controlling agent is used to provide good electrical mobility to the electrophoretic particles. The electric charge controlling agent may include, but is not limited to, metal soap, OLOA series, Ganex series, or a mixture thereof.

The upper and lower insulating layers (not shown) mainly serve to prevent electrified electrophoretic particles 312 from being discharged. The insulating layers are formed using sputtering, chemical vapor deposition (CVD), vacuum deposition, coating, or printing. The insulating layers have a thickness of 0.01 to 10 μm, although the thickness of the insulating layers is not particularly restricted. Preferably, the insulating layers are made of a transparent material. For example, the insulating layers may be made of silicon oxide, silicon nitride, silicon carbide, aluminum oxide, or tantalum oxide ($Ta_2O_3$). Alternatively, the insulating layers may be made of copolymer resin. The second insulating layer 315b, i.e., the lower insulating layer 315b, may be naturally formed at the time of forming the barrier ribs 314. Specifically, when the barrier ribs 314 are formed using a press, the insulating layer is integrally formed with the barrier ribs such that the lower surfaces of the pixel spaces have a predetermined thickness, whereby the lower surfaces of the pixel spaces perform insulation function.

In the electronic paper display device with the above-described constructional characteristics according to the present invention, the plurality of protrusions 330 are formed at the corresponding electrode. As a result, a relatively large electric field is distributed around the electrode at which the electrophoretic particles are located in the initial stage of voltage application. Consequently, the electrophoretic particles are easily separated from the electrode and moved even at low driving voltage.

Figure 16:
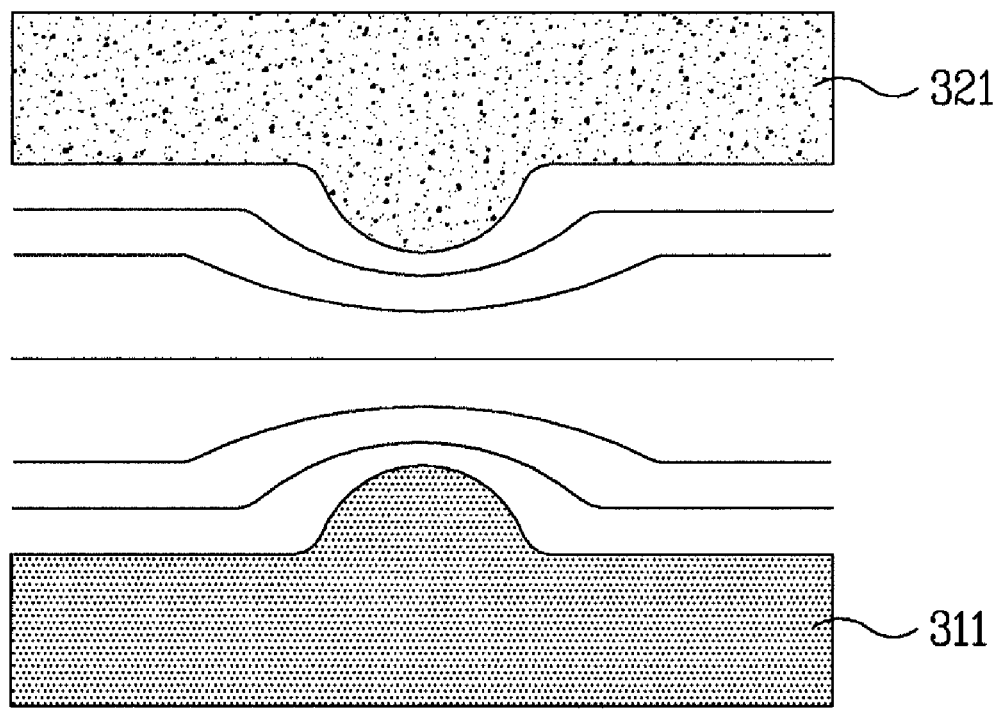
FIG. 16 is a view illustrating electric field distribution of electrodes, having protrusions, according to an embodiment of the present invention.

FIG. 16 is a view illustrating electric field distribution of electrodes, having protrusions, according to an embodiment of the present invention. As shown in FIG. 16, strong electric field is applied to the tip of a protrusion, unlike conventional surface electrodes. Consequently, the particles are easily separated from the corresponding electrodes and moved even at low driving voltage.

The above-described embodiment is given to describe the present invention in detail such that the present invention can be more easily understood, not to limit the present invention. Accordingly, all possible electronic paper display devices which can be commonly modified are included in the scope of the present invention.

Figure 17:
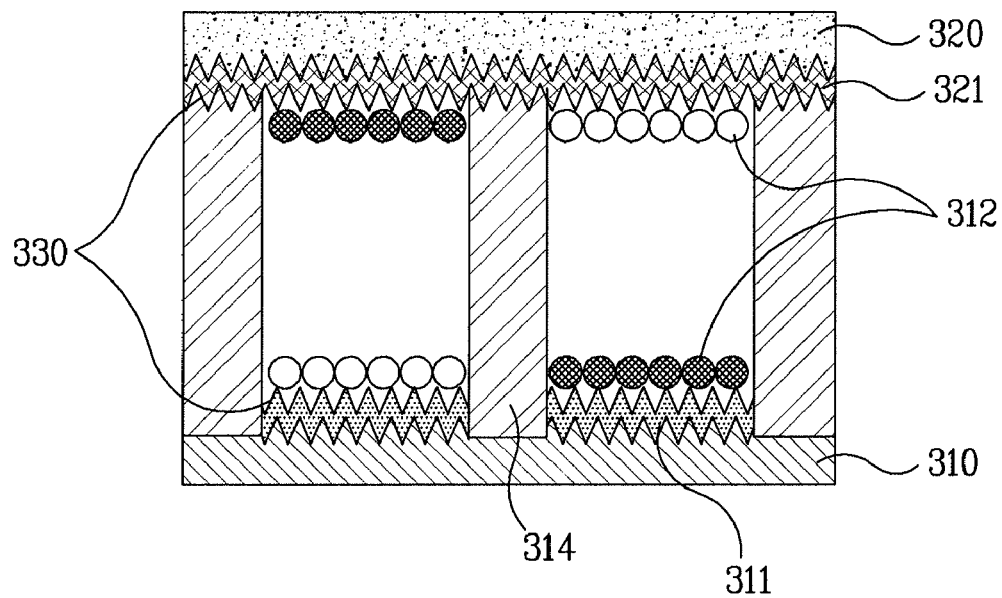
FIG. 17 is a sectional view illustrating an electronic paper display device according to an embodiment of the present invention.

FIG. 17 is a sectional view illustrating an electronic paper display device according to another embodiment of the present invention. In this embodiment, a plurality of protrusions 330 are formed as follows. As shown in FIG. 17, protrusion patterns are formed at first and second substrates, and electrodes are formed on the substrates having the protrusions using deposition or printing. As a result, the protrusion patterns of the substrates are transferred to the electrodes, whereby electrodes, having pluralities of protrusions, are manufactured.

The protrusion patterns may be formed on the substrates by the above-mentioned wet-type or dry-type etching. Alternatively, the protrusion patterns may be formed on the substrates by molding.

Figure 18:
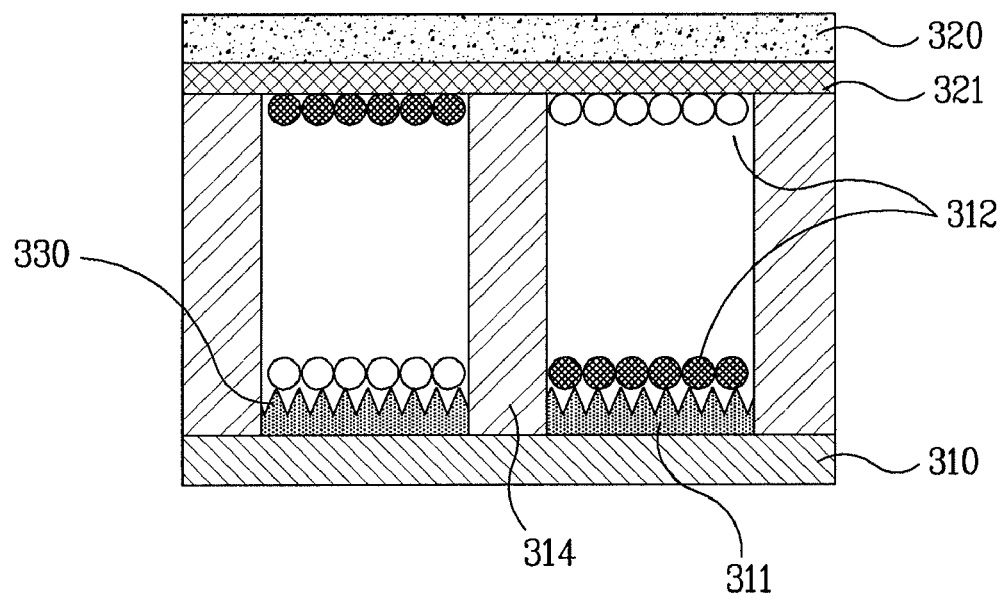
FIG. 18 is a sectional view illustrating an electronic paper display device according to an embodiment of the present invention.

FIG. 18 is a sectional view illustrating an electronic paper display device according to another embodiment of the present invention. In this embodiment, a plurality of protrusions may be selectively formed at a first electrode 321 or a second electrode 311.

Figure 19:
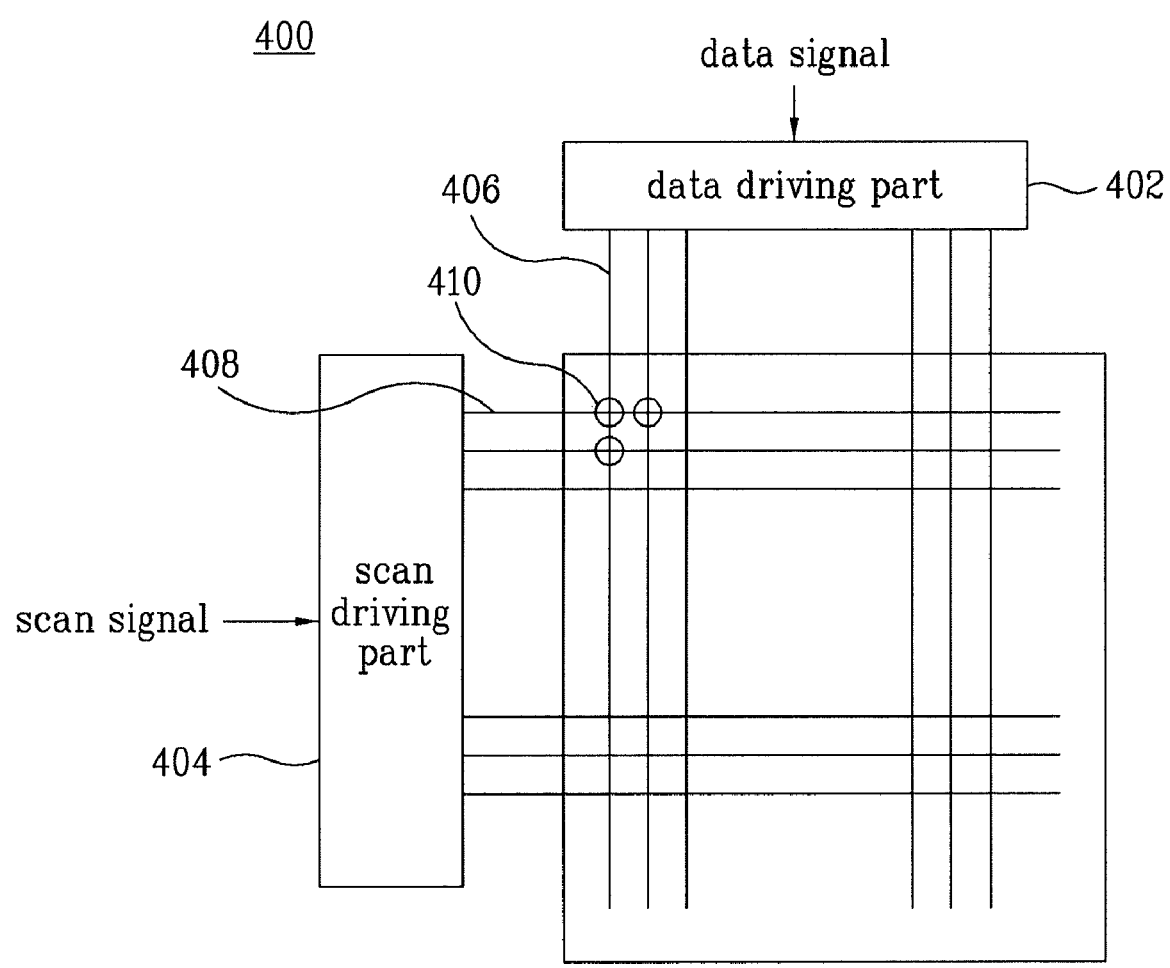
FIG. 19 is a block diagram illustrating a driving unit of an electronic paper display device.

FIG. 19 is a block diagram illustrating a driving unit 400 of an electronic paper display device. As shown in FIG. 19, the driving unit 400 includes a plurality of scan electrodes (lower electrodes) 408 and a plurality of data electrodes (upper electrodes) 406, which are opposite to each other while the scan electrodes 408 and the data electrodes 406 intersect each other, a scan driving part 404 to sequentially drive the scan electrodes 408, and a data driving part 402 to drive the data electrode 406.

At the respective intersections between the scan electrodes 408 and the data electrodes 406 are positioned cells 410 to display pictures. While driving voltages required for the respective cells 410 are applied to the data electrodes 406 through the data driving part 402, the scan electrodes 408 are sequentially selected through the scan driving part 404. The scan driving part 404 may be constituted by a shift register, which is well known in the part to which the present invention pertains.

The scan driving part 404 serves to sequentially select the scan electrodes 408, according to inputted scan signal, so as to apply voltage to the scan electrodes 408. The data driving part 402 serves to apply corresponding voltage to the data electrodes 406 according to inputted data signal.

The scan driving part 404 and the data driving part 402 are synchronized by a signal synchronizer, which is not shown.

Figure 20:
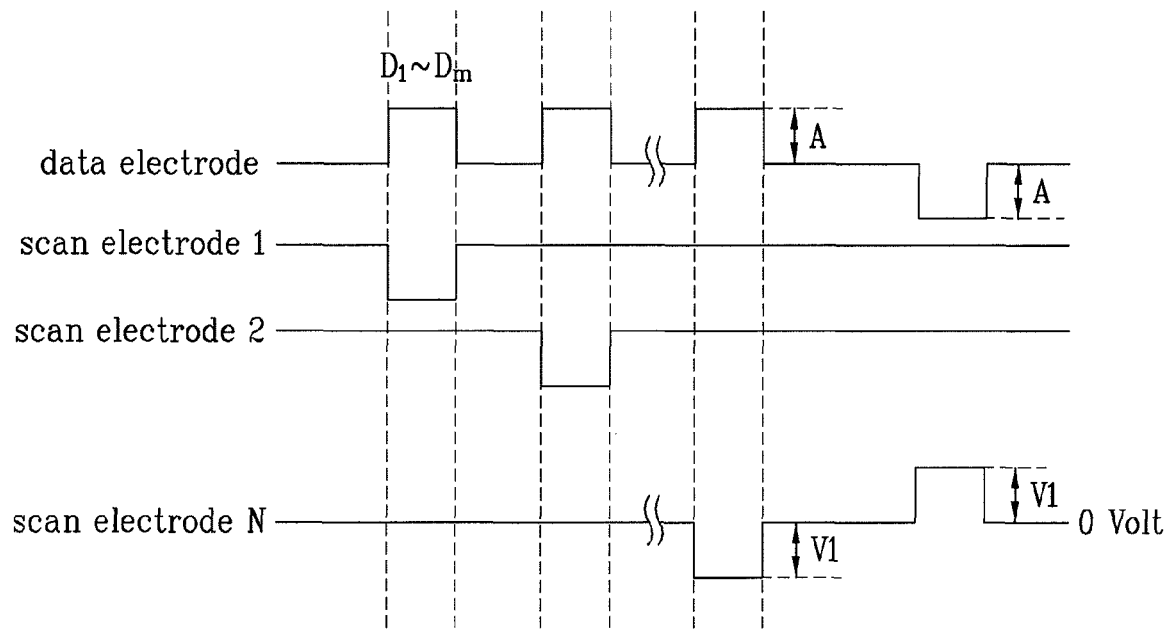
FIG. 20 is a view illustrating waveforms of driving voltage pulses applied to drive the display device shown in FIG. 19.

FIG. 20 is a view illustrating waveforms of driving voltage pulses applied to drive the display device shown in FIG. 19. The driving voltage pulses are applied to display data according to the change of reflection rate of the electronic paper display device shown in FIG. 3.

In the electronic paper display device, as described above, the plurality of data electrodes 406 and the plurality of scan electrodes 408 are arranged in a matrix structure, and the cells 410 are positioned at the respective intersections between the scan electrodes 406 and the data electrodes 408.

A scan pulse having a voltage level of −V1 (when a ground voltage is a base voltage) is applied to a first scan electrode 408. While the scan pulse is applied, a data pulse having a voltage level of A (when a ground voltage is a base voltage) is applied to the plurality of data electrodes 406 existing in a panel.

As a result, a driving voltage of V2 is applied to a cell 410, to which the scan pulse and the data pulse are applied. Consequently, a white particle group having negative charges in the cell 410 moves to the first substrate of the cell 410, and therefore, the light reflection rate is maximized. In consequence, the cell 410, to which the scan pulse and the data pulse are applied, displays white as shown in the drawing.

Figure 1:
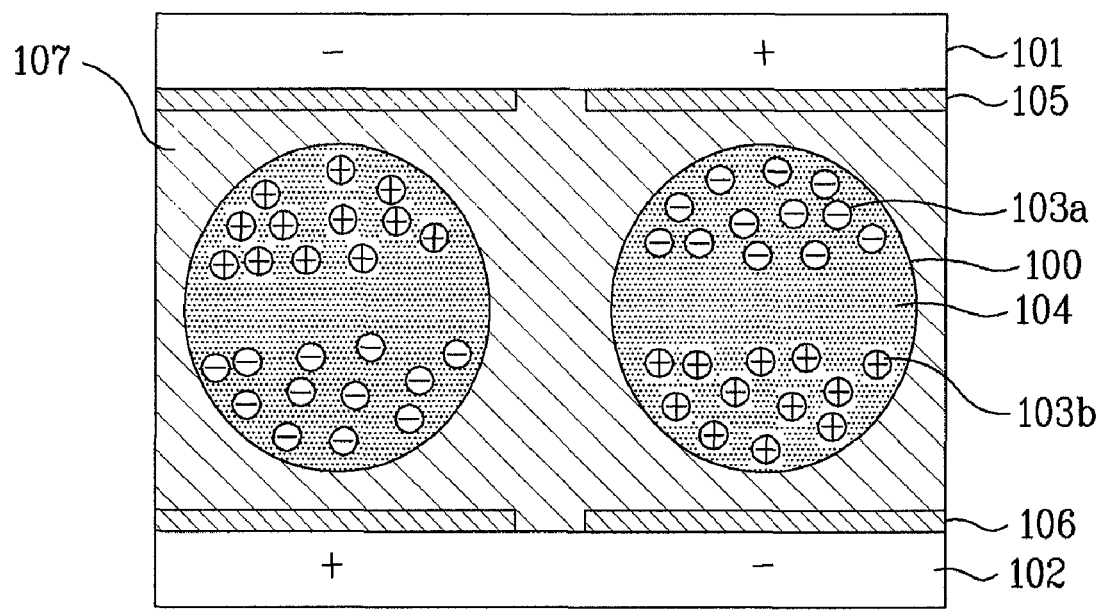
FIG. 1 is a sectional view illustrating an electronic paper display device using micro capsules manufactured by E-Ink Corporation.
Figure 2:
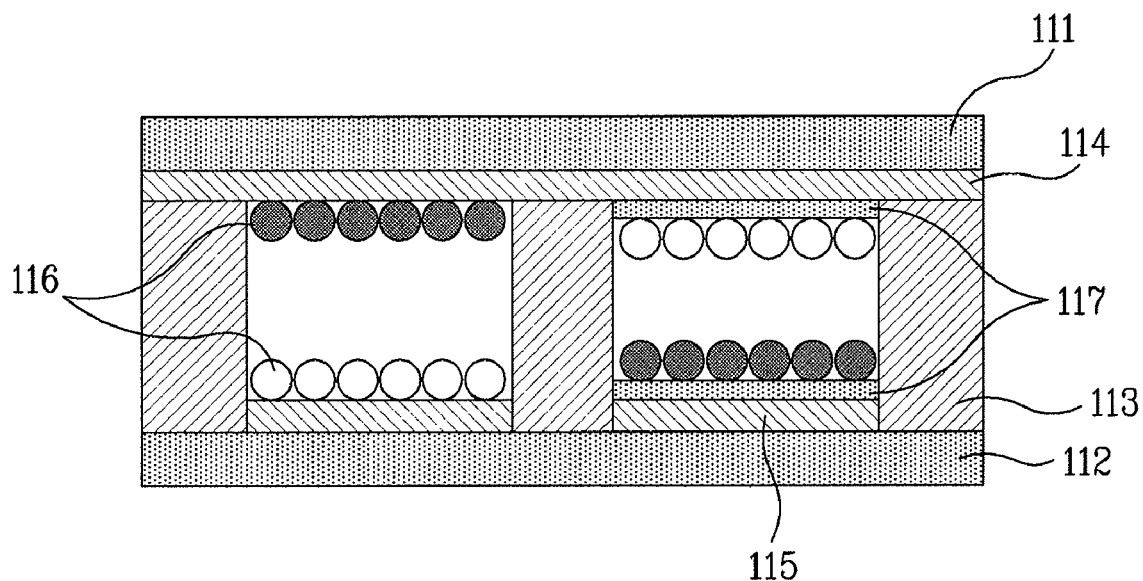
FIG. 2 is a sectional view illustrating a dry-type electronic paper display device.
Figure 3:
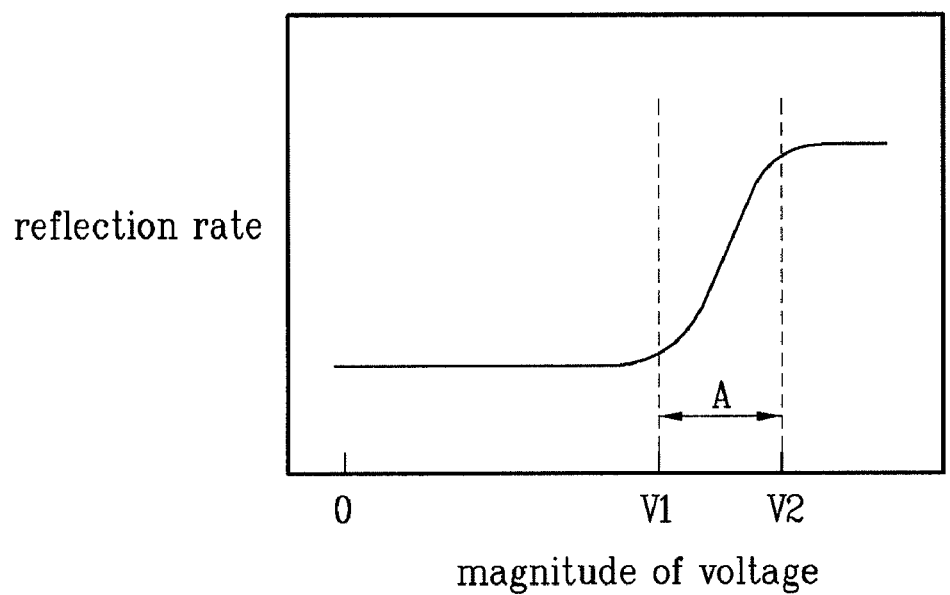
FIG. 3 is a graph illustrating the change of reflection rate based on driving voltage in an electronic paper display device.

When only the scan pulse is applied to the cell 410, on the other hand, the ground voltage is applied to the data electrode 406, and therefore, a driving voltage of V1 is applied to the scan electrode 408 and the data electrode 406. Consequently, when a driving voltage of V1 is applied, as shown in FIG. 3, an electric field is too weakly generated to move the white particle group in the cell 410 to the first substrate of the cell 410. As a result, a black particle group remains at the first substrate of the cell 410, and therefore, the light reflection rate is minimized.

The ground voltage is applied to the remaining scan electrodes 408, to which no scan pulse is applied. This process is performed for all the scan electrodes 408. Consequently, pictures are displayed on the electronic paper display device according to inputted data.

After the operations of all the display devices are performed as described above, a reset pulse having a negative voltage of A is applied to all the data electrodes 406, a reset pulse having a positive voltage of V1 is applied to the scan electrodes 408 such that the white particle group existing at the first substrate of the cell 410 moves to the second substrate of the cell 410, and the black particle group existing at the second substrate of the cell 410 moves to the first substrate of the cell 410. In this way, all the cells 410 are reset.

According to the present invention, the voltage level of the driving voltage pulses applied to the data and scan electrodes 406 and 408 is lowered in consideration of the light reflection rate based on the driving voltage of the electronic paper display device shown in FIG. 3.

Figure 21:
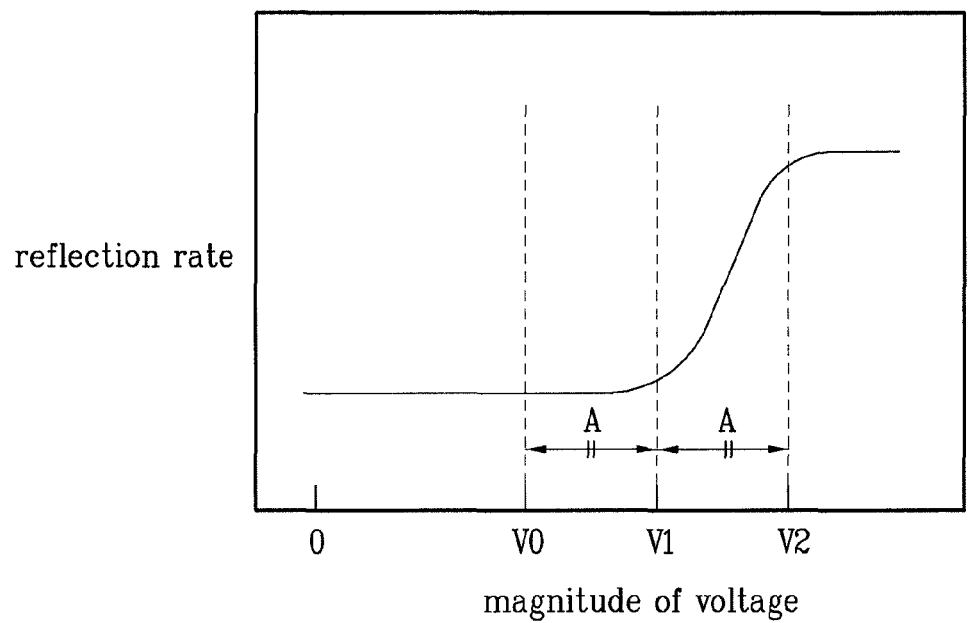
FIG. 21 is a graph illustrating a driving method of an electronic paper display device according to an embodiment of the present invention.

FIG. 21 is a graph illustrating a driving method of an electronic paper display device according to an embodiment of the present invention. FIG. 21 illustrates the light reflection rate based on the same driving voltage of the electronic paper display device as the graph of FIG. 3. Especially, V0 voltage, which is a specific base voltage used in the present invention, is designated in order to reduce the voltage level of the driving voltage pulse applied to the data and scan electrodes 406 and 408.

The V0 voltage shown in the drawing is designated such that the V0 voltage is lower than V1 voltage, which is a driving voltage at which the light reflection rate begins to increase, by voltage difference A between the V1 voltage and V2 voltage, which is a driving voltage at which the light reflection rate is maximized.

Figure 23:
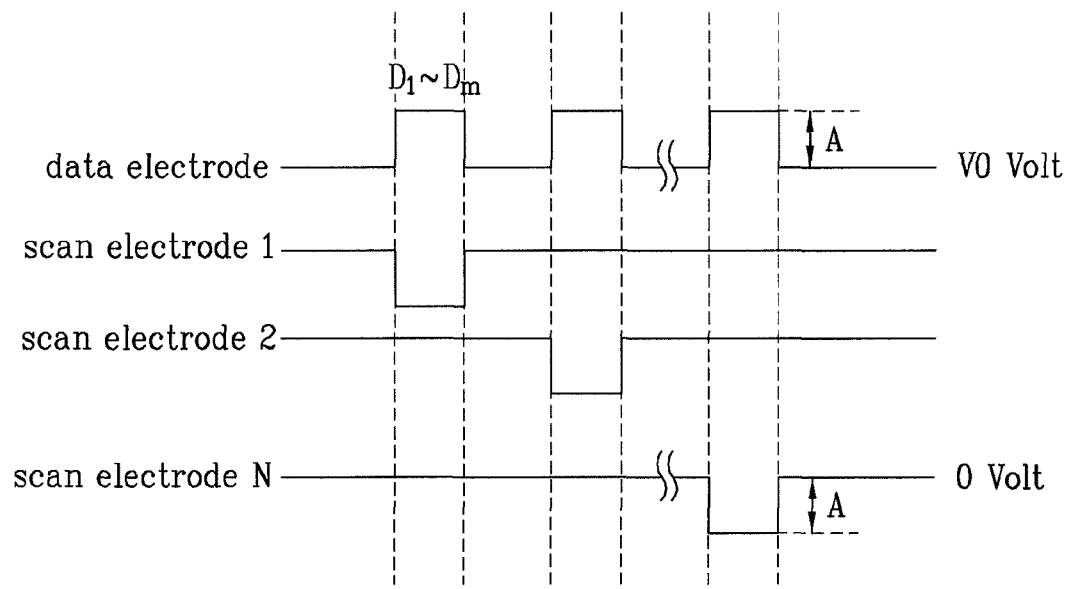
Figure 24:
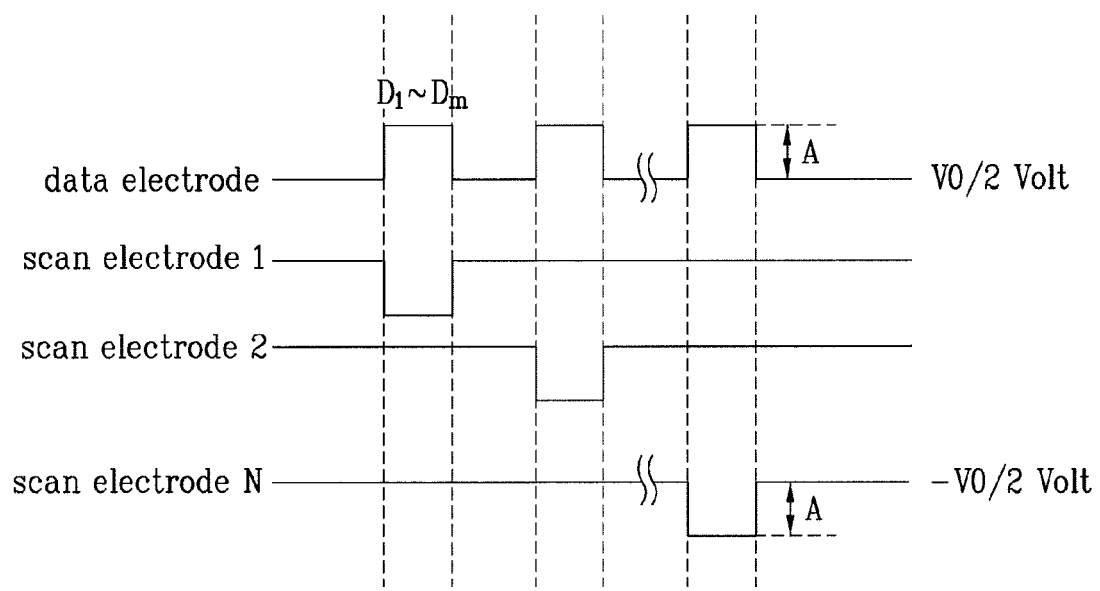

According to the present invention, the voltage level of the driving voltage pulse applied to the data and scan electrodes 406 and 408 is decided on the basis of the V0 voltage. Hereinafter, the driving method of the electronic paper display device according to the present invention will be described in more detail based on driving voltage pulse waveforms according to various embodiments of the present invention as shown in FIGS. 22 to 24.

Figure 22:
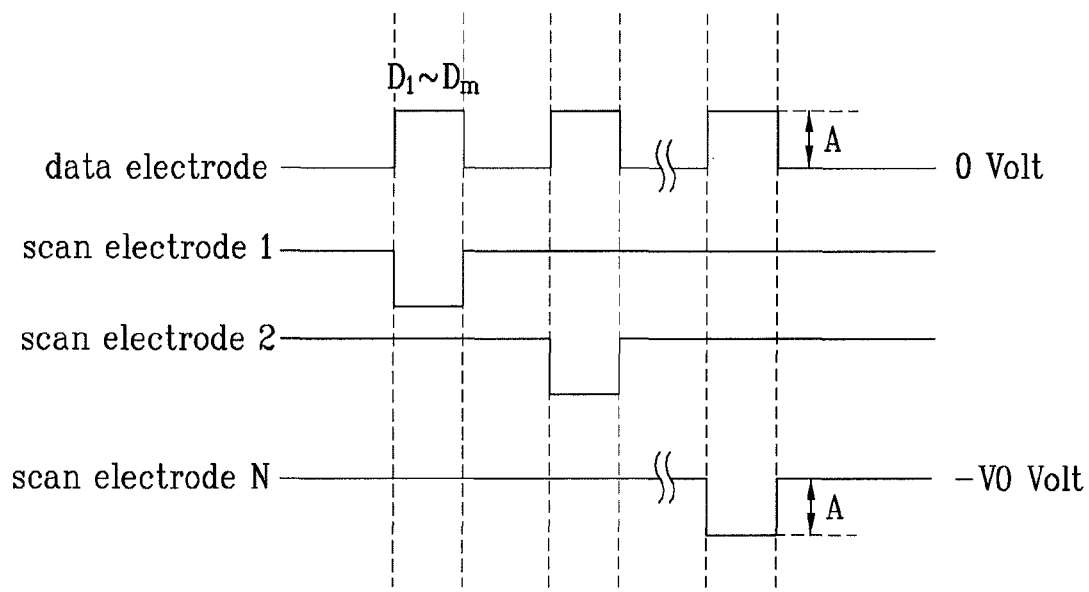
FIGS. 22 to 24 are views respectively illustrating driving waveforms in a driving method of an electronic paper display device according to an embodiment of the present invention.

Referring to driving voltage pulse waveforms of the data and scan electrodes 406 and 408 shown in FIG. 22, a ground voltage (0 volt), as a base voltage, is applied to the data electrode 406, and −V0 voltage, as a base voltage, is applied to the scan electrode 408. The voltage level of the data pulse and the scan pulse is decided from the applied base voltages of the data and scan electrodes 406 and 408 such that V2 voltage necessary to drive the cell 410 can be applied to the cell 410.

Consequently, when the voltage level of the scan pulse becomes −A voltage on the basis of −V0 voltage such that the voltage level of the data pulse becomes A voltage on the basis of the ground voltage, the voltage difference between −(V0+A) voltage level of the scan pulse and +A voltage level of the data pulse becomes V2 voltage (V0+2A), at which the cell 410 can be driven. Eventually, as compared to the driving voltage pulse shown in FIG. 5, it is possible to apply a scan pulse having a negative voltage level of A, which is lower than the V1 voltage by the V0 voltage, to the scan electrode 408 so as to drive the cell 410 of the electronic paper display device. Consequently, the response speed of the driving devices is increased, and the internal voltage of the driving devices is lowered.

When only the scan pulse is applied to the cell 410, the V1 voltage (V0+A) is applied to the data and scan electrodes 406 and 408. Consequently, an electric field which is generated is too weak to move a white particle group in the cell 410 to the first substrate of the cell 410. As a result, a black particle group remains at the first substrate of the cell 410.

After the operations of all the display devices are performed as described above, the devices are reset. The devices may be reset in various manners. In an embodiment applicable to the present invention in which a negative voltage of V2 is applied to the data and scan electrodes 406 and 408 while the internal voltage of the driving devices is not increased, after all the devices are operated, the base voltages of the data and scan electrodes 406 and 408 are changed such that the base voltage of the data electrodes is changed to −V0 voltage, and the base voltage of the scan electrodes is changed to the ground voltage (0 volt). And a reset pulse having a negative voltage of A is applied to the data electrodes 406, and a reset pulse having a positive voltage of A is applied to the scan electrodes 408. As a result, a negative voltage of V2 is applied to the respective cells 410, and therefore, the cells 410 are reset.

Referring to driving voltage pulse waveforms of the data and scan electrodes 406 and 408 according to another embodiment of the present invention shown in FIG. 23, V0 voltage, as a base voltage, is applied to the data electrode 406, and a ground voltage (0 volt), as a base voltage, is applied to the scan electrode 408. The voltage level of the data pulse and the scan pulse is decided from the applied base voltages of the data and scan electrodes 406 and 408 such that V2 voltage necessary to drive the cell 410 can be applied to the cell 410.

Consequently, when the voltage level of the scan pulse becomes −A voltage on the basis of the ground voltage such that the voltage level of the data pulse becomes A voltage on the basis of the V0 voltage, the voltage difference between −A voltage level of the scan pulse and V0+A voltage level of the data pulse becomes V2 voltage (V0+2A), at which the cell 410 can be driven.

Consequently, as previously described with reference to FIG. 22, it is possible to apply a scan pulse having a negative voltage level of A, which is lower than a negative voltage of V1 voltage by the V0 voltage, to the scan electrode 408 so as to drive the cell 410 of the electronic paper display device. Consequently, the response speed of the driving devices is increased, and the internal voltage of the driving devices is lowered.

When only the scan pulse is applied to the cell 410, the V1 voltage (V0+A) is applied to the data and scan electrodes 406 and 408. Consequently, an electric field which is generated is too weak to move a white particle group in the cell 410 to the first substrate of the cell 410. As a result, a black particle group remains at the first substrate of the cell 410.

After the operations of all the display devices are performed as described above, the devices are reset. The devices may be reset in the same reset manner as previously described with reference to FIG. 7.

Consequently, the base voltages of the data and scan electrodes 406 and 408 are changed such that the base voltage of the data electrodes 406 is changed to the ground voltage, and the base voltage of the scan electrodes is changed to the V0 voltage. And a reset pulse having a negative voltage of A is applied to the data electrodes 406, and a reset pulse having a positive voltage of A is applied to the scan electrodes 408. As a result, a negative voltage of V2 is applied to the respective cells 410, and therefore, the cells 410 are reset.

Referring to driving voltage pulse waveforms of the data and scan electrodes 406 and 408 according to another embodiment of the present invention shown in FIG. 24, V0/2 voltage, as a base voltage, is applied to the data electrode 406, and −V0/2 voltage, as a base voltage, is applied to the scan electrode 408.

The embodiment shown in FIG. 24 is identical to the embodiments shown in FIGS. 22 and 23 in that the voltage levels of the data pulse and the scan pulse to drive the cell from the base voltage are the same except that the base voltages of the data and scan electrodes 406 and 408 of the embodiment shown in FIG. 24 are different from the base voltages of the data and scan electrodes 406 and 408 of the embodiments shown in FIGS. 22 and 23. Also, after the operations of all the display devices are performed, the devices are reset in the same reset manner as previously described in the embodiments shown in FIGS. 22 and 23. Accordingly, a detailed description of the embodiment shown in FIG. 24 will not be given.

According to the present invention, a voltage which is lower than V1 voltage, i.e., a threshold voltage at which the light reflection rate begins to be changed, is designated as V0 voltage so as to reduce the voltage level of the driving voltage pulses applied to the data and scan electrodes 406 and 408 in consideration of the light reflection rate of the electronic paper display device.

And, as previously described with reference to FIGS. 22 to 24, V0 voltage, as the base voltage, is applied to the data electrode 406, or −V0 voltage, as the base voltage, is applied to the scan electrode 408, such that the voltage difference corresponding to the magnitude of the V0 voltage is created at the data and scan electrodes 406 and 408. Alternatively, V0/2 voltage, as the base voltage, may be applied to the data electrode 406, and −V0/2 voltage, as the base voltage, may be applied to the scan electrode 408.

Consequently, the driving devices generate pulse to drive the cell 410 from the base voltage applied to the data and scan electrodes 406 and 408, and therefore, the voltage level of the driving voltage pulse is lowered by the base voltage difference between the date and scan electrodes 406 and 408, i.e., the V0 voltage.

As apparent from the above description, the electronic paper display device, the manufacturing method and the driving method of the electronic paper display device have the following effects.

First, the micro protrusion members are formed at the electrodes with which electrophoretic particles are brought into contact or at the insulating layers. As a result, the electrophoretic particles are prevented from being securely attached to the upper or the lower structure. Consequently, the quality of pictures is improved, the contrast ratio of the pictures is increased, and the driving voltage is reduced.

Second, the sizes and the injection amounts of two kinds of electrophoretic particles can be changed such that the relative sizes and the injection amounts of the electrophoretic particles are different from each other. Consequently, it is possible to lower the driving voltage by excessively electrifying the electrophoretic particles of one kind.

Third, a plurality of protrusions are formed at the corresponding electrode such that a relatively large electric field is distributed around the electrode at which electrophoretic particles are located in the initial stage of voltage application. As a result, the electrophoretic particles are easily separated from the electrode and moved even at low driving voltage. Consequently, it is possible to lower the driving voltage.

Fourth, the voltage level of the driving voltage pulse can be lowered. Consequently, it is possible to further increase the response speed of the driving devices and to lower the internal voltage of the devices, thereby reducing the costs related to the driving devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electronic paper display device comprising:
   a first substrate and a second substrate, which are disposed opposite to each other while the first substrate and the second substrate are spaced apart from each other;
   a plurality of first electrodes and a plurality of second electrodes formed at the bottom of the first substrate and at the top of the second substrate, respectively;
   a plurality of barrier ribs disposed between the first substrate and the second substrate to form a plurality of cells;
   electrophoretic particles injected in the cells; and
   a micro protrusion member formed at the bottom of each first electrode and/or at the top of each second electrode.

2. The electronic paper display device according to claim 1, wherein micro protrusion member is made of an insulating material.

3. The electronic paper display device according to claim 1, further comprising:
   a first insulating layer disposed between each first electrode and the first micro protrusion member formed at the bottom of each first electrode.

4. The electronic paper display device according to claim 1, further comprising:
   a second insulating layer disposed between each second electrode and the second micro protrusion member formed at the top of each second electrode.

5. The electronic paper display device according to claim 1, wherein the micro protrusion member is formed by applying micro particles having a size of 0.1 to 0.01 times the size of the electrophoretic particles.

6. The electronic paper display device according to claim 1, wherein the micro protrusion member is formed by applying micro particles having a size of 10 nm to 10 μm.

7. The electronic paper display device according to claim 1, wherein the micro protrusion member has a thickness of 10 nm to 10 μm.

8. The electronic paper display device according to claim 1, wherein the micro protrusion member is constructed in a hemispherical protrusion shape, a pyramidal protrusion shape, in a conical protrusion shape, in a prismatic protrusion shape, in a cylindrical protrusion shape, or in a combination thereof.

9. The electronic paper display device according to claim 1, wherein the micro protrusion member contains polymer or inorganic oxide.

10. The electronic paper display device according to claim 9, wherein the polymer is polymethyl methacrylate (PMMA), polycarbonate (PC), polyethylene terephthalate (PET), polyimide (PI), or polystyrene (PS).

11. The electronic paper display device according to claim 9, wherein the inorganic oxide is silicon dioxide ($SiO_2$), titanium dioxide ($TiO_2$), aluminum oxide ($Al_2O_3$), or zinc oxide (ZnO).

12. A manufacturing method of an electronic paper display device, comprising:
    manufacturing a first structure, including forming a first electrode at the bottom of a first substrate and forming a first micro protrusion member at the bottom of the first electrode;
    manufacturing a second structure, including forming a second electrode at the top of a second substrate and forming a second micro protrusion member at the top of the second electrode;
    manufacturing barrier ribs at the top of the second structure to form cell spaces;
    injecting electrophoretic particles into the cell spaces to display pictures; and
    stacking and attaching the first structure and the second structure having the barrier ribs to each other.

13. The manufacturing method according to claim 12, further comprising:
    forming a first insulating layer between the first electrode and the first micro protrusion member.

14. The manufacturing method according to claim 12, further comprising:
    forming a second insulating layer between the second electrode and the second micro protrusion member.

15. The manufacturing method according to claim 12, wherein the micro protrusion members are formed in a hemispherical shape, in a pyramidal shape, in a conical shape, in a prismatic shape, in a cylindrical shape, or in a combination thereof.

16. The manufacturing method according to claim 12, wherein the electrophoretic particles are dry-type electrophoretic particles.

17. The manufacturing method according to claim 12, wherein first and second electrophoretic particles are injected into the cells while the particle amounts and the particle diameters of the first and second electrophoretic particles are different from each other.

18. The manufacturing method according to claim 12, wherein the micro protrusion members are integrally formed with the first electrode or the second electrode.

19. The manufacturing method according to claim 18, wherein the micro protrusion members are formed by etching the first electrode or the second electrode using dry-type etching or wet-type etching.

20. The manufacturing method according to claim 18, wherein the micro protrusion members are formed in a hemispherical shape, in a pyramidal shape, in a conical shape, in a prismatic shape, in a cylindrical shape, or in a combination thereof.

21. The manufacturing method according to claim 12, wherein the forming the micro protrusion members includes applying a material containing organic polymer or inorganic oxide micro particles having a size of 0.1 to 0.01 times the size of the electrophoretic particles.

22. The manufacturing method according to claim 21, wherein the forming the micro protrusion members is carried out using photolithography after applying the organic polymer or the inorganic oxide.

23. The manufacturing method according to claim 21, wherein the forming the micro protrusion members is carried out using a mold having predetermined micro grooves after applying the organic polymer or the inorganic oxide.

24. The manufacturing method according to claim 21, wherein the polymer is polymethyl methacrylate (PMMA), polycarbonate (PC), polyethylene terephthalate (PET), polyimide (PI), or polystyrene (PS).

25. The manufacturing method according to claim 21, wherein the inorganic oxide is silicon dioxide ($SiO_2$), titanium dioxide ($TiO_2$), aluminum oxide ($Al_2O_3$), or zinc oxide (ZnO).

* * * * *